United States Patent
Gueziec

(12) 
(10) Patent No.: US 6,175,365 B1
(45) Date of Patent: Jan. 16, 2001

(54) SURFACE SIMPLIFICATION PRESERVING ERROR TOLERANCES

(75) Inventor: Andre Pierre Gueziec, Mamaroneck, NY (US)

(73) Assignee: International Business Machines Corporation, Armonk, NY (US)

(*) Notice: Under 35 U.S.C. 154(b), the term of this patent shall be extended for 0 days.

(21) Appl. No.: 09/225,085

(22) Filed: Jan. 4, 1999

Related U.S. Application Data

(62) Division of application No. 08/742,641, filed on Nov. 1, 1996.

(51) Int. Cl.[7] .................................................. G06F 15/00
(52) U.S. Cl. .............................................................. 345/419
(58) Field of Search .................................... 345/419, 440, 345/441, 442, 443, 117, 118

(56) References Cited

U.S. PATENT DOCUMENTS 5,649,079 * 7/1997 Holmes ................................ 345/419

OTHER PUBLICATIONS

Rossignac, "Full Range Approximation of Triangulated Polyhedra", vol. 15, No. 3, Aug. 1996.*

* cited by examiner

*Primary Examiner*—Phu K. Nguyen
(74) *Attorney, Agent, or Firm*—Jay P. Sbrollini

(57) ABSTRACT

Computer systems generate and display objects represented by triangles defined by coordinates of vertices. The present invention generates potential coordinates of a simplified vertex based upon coordinates of a first vertex and a second vertex that define an edge of the triangles. A first set of triangles that are adjacent to the edge are identified, and a first set of error values corresponding to the vertices of the first set of triangles are derived. A second set of triangles tat share the simplified vertex are identified, and a second set of error values corresponding to the vertices of the second set of triangles are derived. The coordinates of the simplified vertex are stored in memory for reuse based upon a predetermined criterion involving the second error values and, preferably, one or more tolerance values. The second error values are derived from error values of a plurality of planar polygons corresponding to the first set of triangles.

50 Claims, 29 Drawing Sheets regular vertex boundary vertex singular vertex

SURFACE SIMPLIFICATION PRESERVING ERROR TOLERANCES

This application is a division of U.S. patent application Ser. No. 08/742,641, filed Nov. 1, 1996, herein incorporated by reference in its entirety.

BACKGROUND OF THE INVENTION

1. Technical Field

The invention relates generally to computer graphics systems, and, more particularly, to computer graphics systems that provide real-time interactive and/or scientific visualization of complex geometric models.

2. Description of the Related Art

Traditional computer graphics systems are used to create a model of three-dimensional objects and render the model for display on a two-dimensional display device such as a cathode ray tube or liquid crystal display. Typically, the three-dimensional objects of the model are each represented by a multitude of polygons (or primitives) that approximate the shape of the object. The primitives that define an object are typically defined by coordinates in a local coordinate system. For example, one of the primitives that may be used to define an object is a triangle, which is defined by the coordinates of three vertices in the local coordinate system.

Such polygonal surfaces may be used for generating pictures and animations, and may also be used in scientific visualization, in geometric computing as well as in medical imaging. More specifically, polygonal surfaces have been used for measuring volumes, for aligning three dimensional scans such as Computed Tomography or Magnetic Resonance scans, or for finite element applications. IBM Visualization Data Explorer is an example of software that generates and visualizes polygonal surfaces.

The rendering of a polygonal surfaces is divided into two stages: geometry processing and rasterization. Geometry processing typically includes a modeling transformation, lighting calculations, a viewing transformation, a clipping function, and viewport mapping. The modeling transformation transforms the primitives from the local coordinate system to a world coordinate system. The lighting calculations evaluate an illumination model at various locations: once per primitive for constant shading, once per vertex for Gouraud shading, or once per pixel for Phong shading. The viewing transformation transforms the primitives in world coordinates to a 3D screen coordinate system (sometimes referred to as the normalized projection coordinate system). The clipping function determines the primitives (or portions of the primitives) that are within the viewing frustrum. And viewport mapping maps the coordinates of the clipped primitives to the normalized device coordinate system (sometimes referred to as the 2D device coordinate system).

Rasterization is the process which converts the description of the clipped primitives generated during geometry processing into pixels for display. A typical primitive, as shown in FIG. 1A, is a triangle $T_1$. Other area or surface primitives conventionally are converted into one or more triangles prior to rasterization. Consequently, the conventional rasterization process need only to handle triangles. The triangle $T_1$ is represented by the (x,y,z) coordinates at each of its vertices. The (x,y) coordinates of a vertex tell its location in the plane of the display. The z coordinate tells how far the vertex is from the selected view point of the three-dimensional model. Rasterization is typically divided into three tasks: scan conversion, shading, and visibility determination.

Scan conversion utilizes the (x,y) coordinates of the vertices of each triangle to compute a set of pixels S which is covered by the triangle.

Shading computes the colors of the set of pixels S covered by each triangle. There are numerous schemes for computing colors, some of which involve computationally intensive techniques such as texture mapping. Shading typically utilizes the lighting calculations described above with respect to geometric processing.

Visibility determination utilizes the z coordinate of each triangle to compute the set of pixels $S_v$ (a subset of S) which are "visible" for the triangle. The set $S_v$ will differ from the set S if any of the pixels in set S are covered by previously rasterized triangles whose z values are closer to the selected view point. Thus, for each triangle in the model, a pixel is "visible" if it is in the set $S_v$ or "hidden" if it is the set S but not in the set $S_v$. Moreover, a triangle is "all visible" if the set $S_v$ is identical to set S, "partially hidden" if the set $S_v$ is not identical to set S and set $S_v$ is not empty, or "all hidden" if set $S_v$ is empty. For example, FIG. 1B shows two triangles, triangle T1 and T2, wherein triangle T1 is partially hidden by triangle T2. Visibility determination is traditionally accomplished using a z-buffer technique. The Z-buffer stores an entry for each pixel that represents the z-value of the visible primitive at the given pixel. The z-value (Znew) of a set of pixels covered by a given triangle is determined through interpolation. For each pixel within the set, Znew at the given pixel is compared to the z-value (Zold) stored as an entry in the Z-buffer corresponding to the given pixel, and the entry Zold is updated with Znew according to results of the compare operation.

Rasterization is completed by writing the colors of the set of visible pixels $S_v$ to an image buffer for display.

As models become more and more complex, traditional rendering techniques are too computationally intensive for many graphics systems and result in degraded performance. For example, it is not rare in medical imaging applications that a surface may contain hundreds of thousands of triangles. In such a case, traditional rendering techniques are not sufficient using current computer hardware and software. In order to solve this problem, several simplification techniques have been developed that construct an approximation of the original surface, and thus reduce the level of detail of the graphical representation of the surface.

An example of such simplification techniques is described Kalvin et al. "Superfaces: Polygonal Mesh Simplification with Bounded Error", Computer Graphics and Applications, Vol. 16, No. 3, May 1996, pp. 64–77, Cohen et al., "Simplification Envelopes", ACM SIGGRAPH 96, August 1996, Addison Wesley, pp. 119–128, and Ronfard et al., "Full-Range Approximation of Triangulated Polyhedra", Computer Graphics Forum, Vol. 15, 1996, pp. 67–76. All three algorithms do not undo any simplification that was previously made.

The simplification technique of Kalvin et al. attempts to merge surface triangles to quasi-planar "superfaces". Each original triangle is merged with one superface, possibly limited to one single triangle. Each superface is guaranteed to lie within a given distance to the triangles that were merged into the superface. However, because the algorithm does not give priorities to triangles before merging them, the algorithm does not produce economical simplifications for a given amount of processing time. In addition, the algorithm does not preserve the volume of a solid. Finally, the algorithm does not attempt to optimize the aspect ratios of triangles.

The simplification technique of Cohen et al. begins by constructing an envelope around the original surface, whose width corresponds to the maximum distance that is allowed between the simplified surface and the original surface. The envelope does not intersect itself. The surface vertices are then selected as candidates for removal and the hole left by the vertex removal is triangulated. The simplification algorithm ends when no more removal is possible. A verification process verifies that each new triangle is inside the envelope and that it does not intersect other surface triangles. This algorithm is computationally intensive and does not preserve the volume of a solid.

The simplification technique of Ronfard et al. places the edges of the surface in a priority queue, ordered by a key that measures the approximation error after the edge collapse. Until the key exceeds a user specified value, the edge with the highest priority is collapsed. This algorithm is computationally intensive because each time an edge collapse is performed, the simplification error must be re-estimated for each edge that was adjacent to the collapsed edge. Moreover, the technique does not guarantee that the distance between any point of the original surface and the simplified surface and the distance between any point of the simplified surface and the original surface will be less than a user-specified tolerance, but can only guarantee that a factor of this tolerance, depending on the surface geometry, will be respected. Also, the technique does not preserve a volume of a solid.

Moreover, none of the prior art techniques report, for each point of the simplified surface, a useful bound to the error at that point, which is the distance to the original surface at that point. Instead, the prior art techniques report a global error bound which is not directly related to the particular error at that point.

SUMMARY OF THE INVENTION

The above-stated problems and related problems of the prior art are solved with the principles of the present invention, surface simplification preserving a solid volume and respecting distance tolerances. Computer systems may be used to generate and display objects represented by triangles defined by coordinates of vertices. The present invention generates coordinates of a simplified vertex based upon coordinates of vertices adjacent to a first vertex and to a second vertex that define an edge of the triangles. First, a set of triangles that are adjacent to the edge is identified, Second, a first volume associated with the set of triangles is calculated. Finally, the coordinates of the simplified vertex are calculated such that a second volume associated with the simplified vertex corresponds to the first volume.

In addition, a technique is presented that generates a second object which is a simplified representation of a first object. The technique begins by identifying first and second vertices that define an edge. The coordinates of a simplified vertex that corresponds to first and second vertices of the edge is determined. Error values and tolerance values are assigned to vertices. First error volumes corresponding to the vertices of a first set of triangles are derived. The first set of triangles share at least one of the first and second vertices of the edge. The first error volumes are based upon the error values assigned to vertices of the first set of triangles. A second set of triangles that share the simplified vertex is identified and partitioned into a set of planar polygons. Second error volumes corresponding to vertices of the set of planar polygons are derived based upon the first error volumes. The second error volumes enclose the first error volumes. Third error volumes corresponding to vertices of the second set of triangles are derived. The third error volumes are based upon the first and second error volumes. The third volumes enclose both the first error volumes and the second error volumes. A tolerance volume corresponding to the simplified vertex is derived. Finally, the coordinates of the simplified vertex is stored in memory for subsequent reuse based upon a comparison operation of the third error volume corresponding to the simplified vertex and the tolerance volume.

DETAILED DESCRIPTION OF THE PREFERRED EMBODIMENTS

Figure 1A:
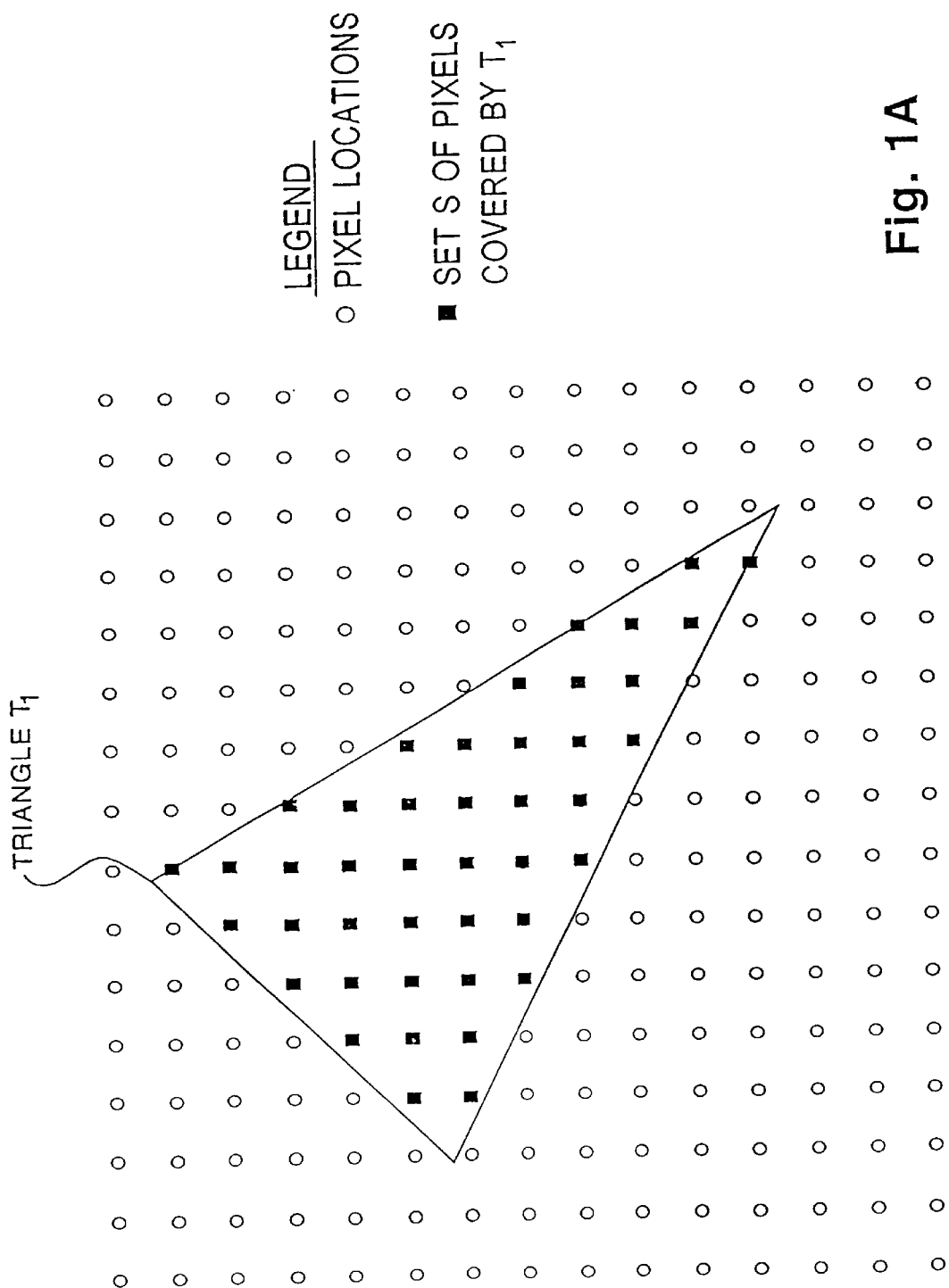
FIG. 1A is a pictorial representation of the rasterization of a triangle T1.
Figure 1B:
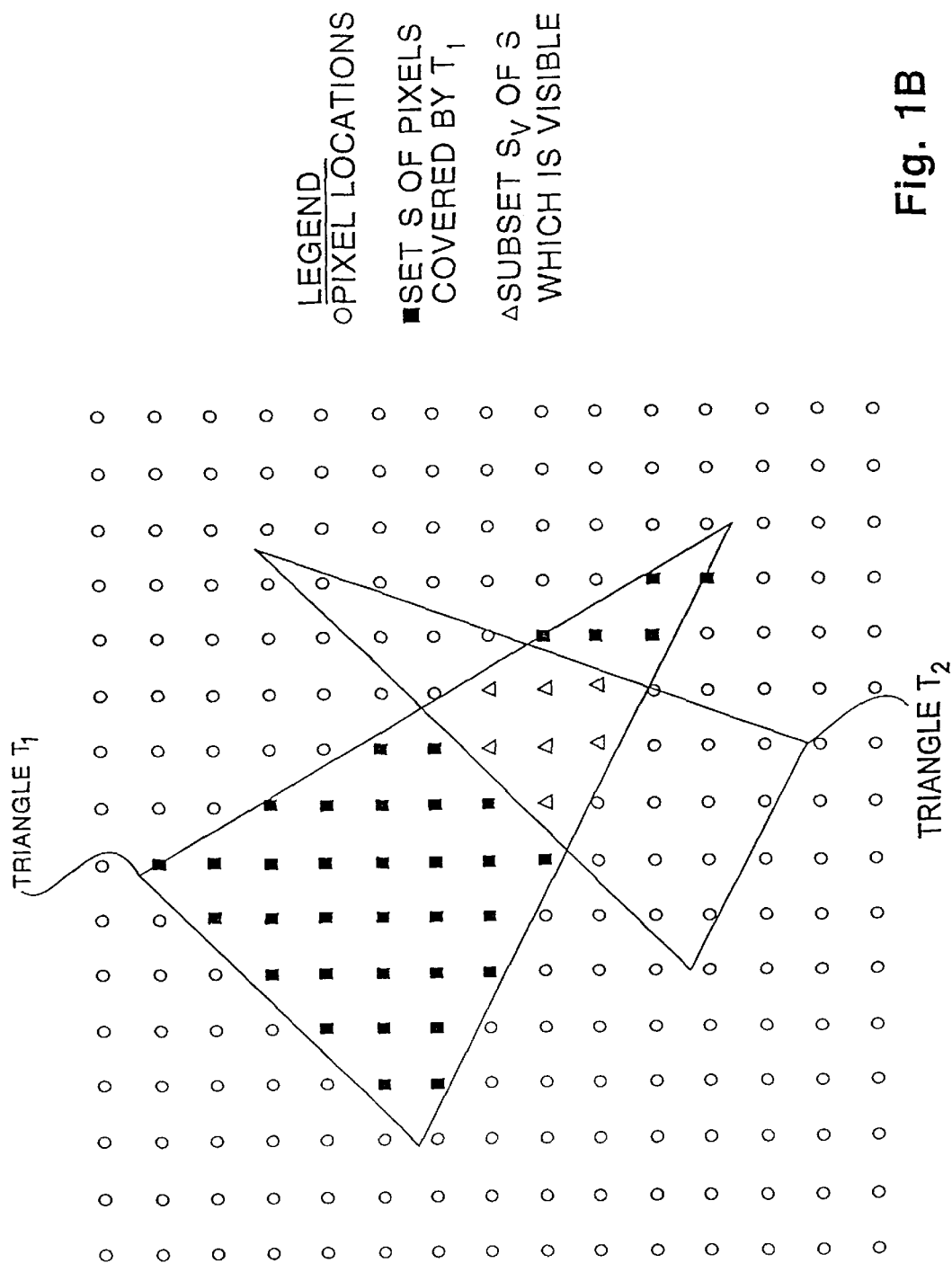
FIG. 1B is a pictorial representation of the rasterization of triangles T1 and T2, wherein triangle T1 is partially hidden by triangle T2.
Figure 2:
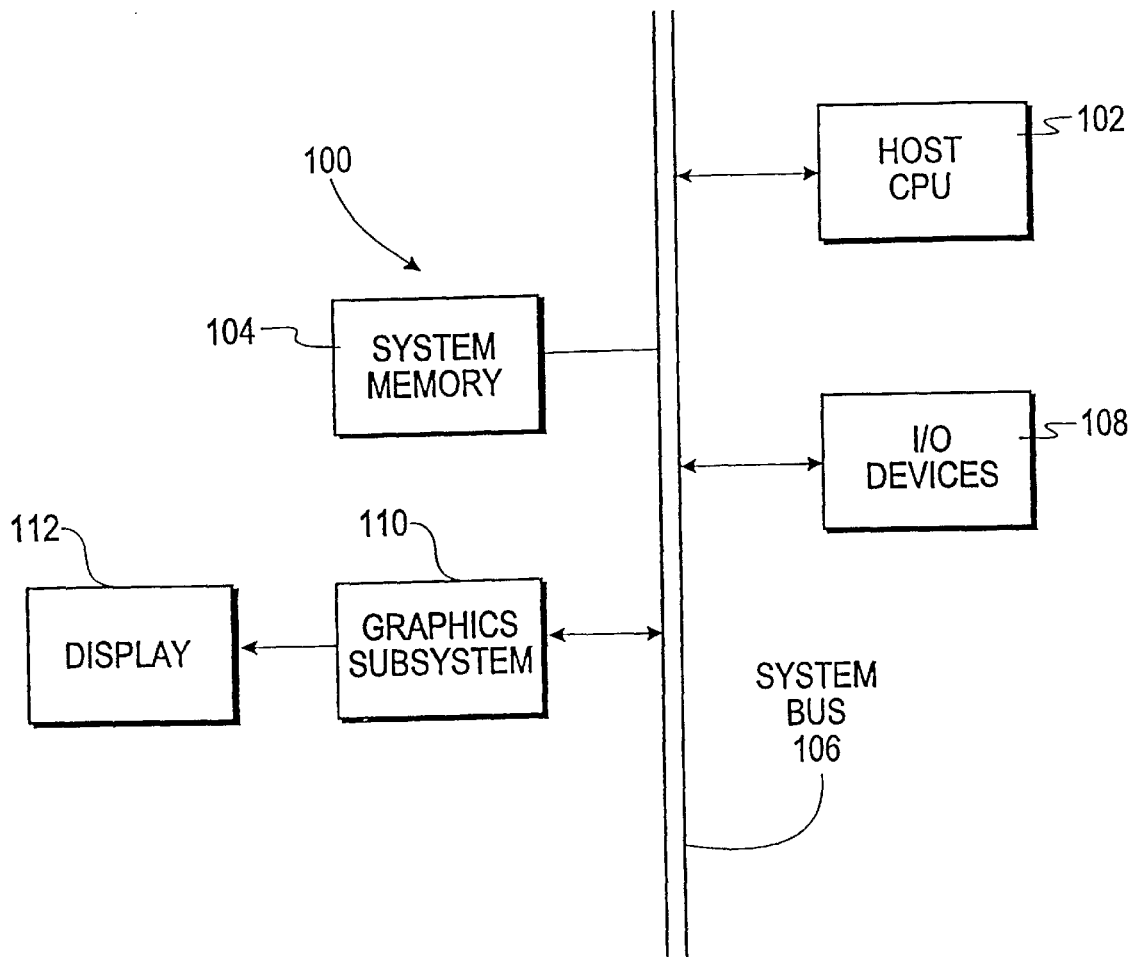
FIG. 2 is a functional block diagram of a graphics work station.

As shown in FIG. 2, a conventional graphics system 100 includes a host processor 102 which is coupled to a system memory 104 via a system bus 106. The system memory 104 consists of random access memory (RAM) that stores graphics data defining the objects contained in one or more three dimensional models. The graphics data that defines each object consists of coordinates in a local coordinate system and attributes (e.g. color, reflectance, texture) of primitives. The primitives are geometric entities such as a polygon, line or surface. Typically, the primitives are triangles defined by the coordinates of three vertices in the local coordinate system. In the event that a model includes non-triangular primitives, such primitives may be approximated by planar polygons (i.e., tesselated) and such planar polygons may be triangulated. Triangulation may be accomplished using various known algorithmns and need not introduce any new vertices into the model. As a result of the triangulation operation, each face (or surface) of the original model is decomposed into one or more non-overlapping triangular primitives.

The system memory 104 includes an ordered list of vertices of the triangles that define the surfaces of objects that make up a three dimensional model. In addition, the system memory 104 may store a list of triangle identifiers that correspond to each of the triangles and transformation matrices. The transformation matrices are used to transform the objects of the model from the local coordinate system to a world coordinate system, and thus specify the position, orientation and scale of the triangles in the model.

Input/output (I/O) devices 108 interface to the host processor 102 via the system bus 106. The I/O devices may include a keyboard, template or touch pad for text entry, a pointing device such as a mouse, trackball, Spaceball or light pen for user input, and non-volatile storage such as a hard disk or CD-ROM for storing the graphics data and any application software. As is conventional, the graphics data and application software is loaded from the non-volatile storage to the system memory 104 for access by the system processor 102.

The application software typically includes one or more user interfaces that provides the user with the ability to update the view point (or camera) and thus navigate through the model. In addition, the application software typically includes one or more user interfaces that provide the user with the ability to perform animations, which is the view from a series of pre-defined view points. When the view point is updated, the application software typically utilizes the transformation matrices stored in the system memory 104 to transform the primitives of the model from the local coordinate system to a world coordinate system. The application software executing on the host processor 102 then supplies a graphics order to render the model to a graphics subsystem 110 that interfaces to the system memory 104 via the system bus 106.

Figure 3:
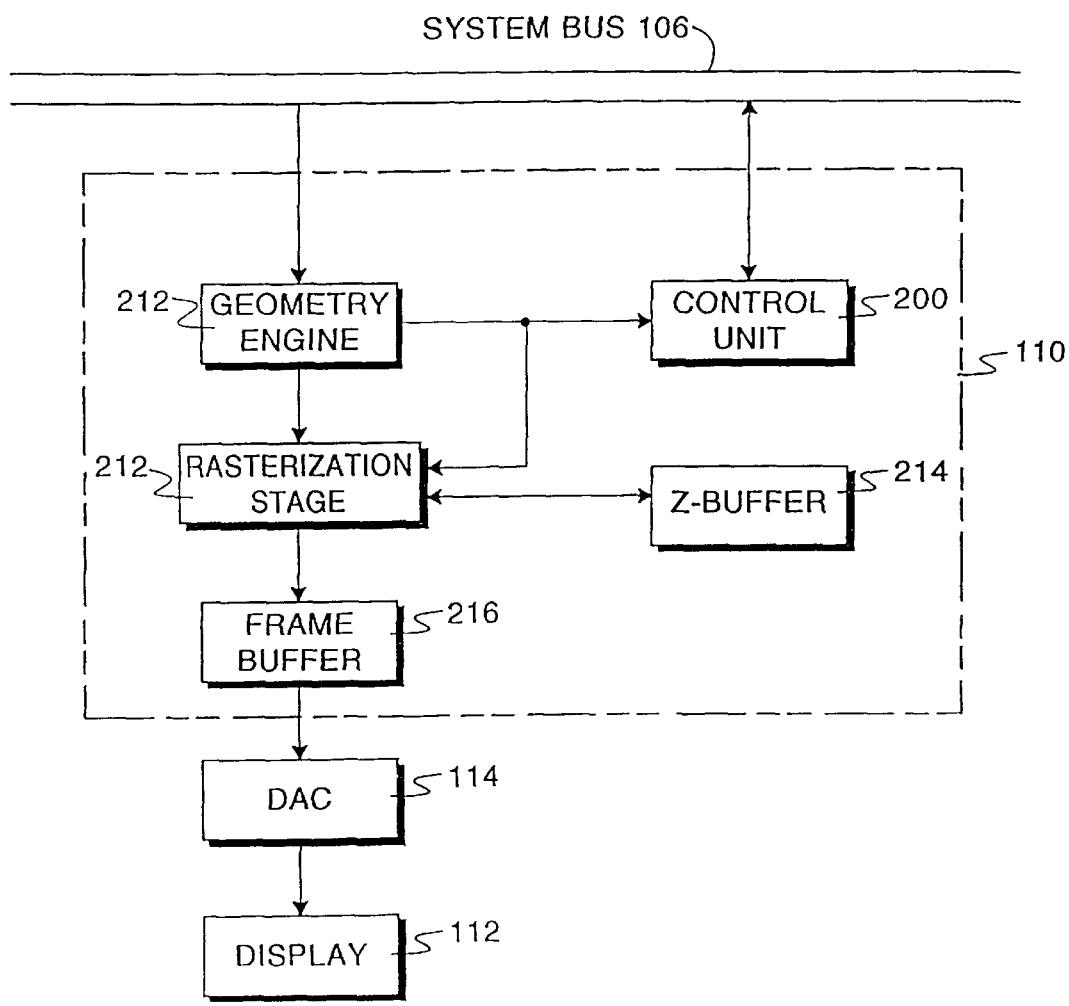
FIG. 3 is a functional block diagram of a graphics subsystem of the graphics work station of FIG. 2.

Generally, the graphics subsystem 110 operates to render the graphics data stored in the system memory 104 for display on a display area of a display device 112 according to the graphics orders transferred from the host processor 102 to the graphics subsystem 110. The display device 112 may utilize raster scan techniques or liquid crystal display techniques to display the pixels. The pixel data generated by the graphics subsystem 110 is in digital form. Typically, the display device 112 requires the pixel data in analog form. In this case, as shown in FIG. 3, a digital-to-analog converter 114 may be placed between the graphics subsystem 110 and the display device 112 to convert the pixel data from a digital to an analog form.

The graphics orders typically consist of a sequence of data blocks that include, or point to, the graphics data (e.g. coordinates and attributes of one or more primitives) that defines the primitives of the model, associated transformation matrices, and any other necessary information required by the graphics subsystem 110. The primitives associated with the graphics orders are typically defined by the value of the geometric coordinates or homogeneous coordinates for each vertex of the primitive. In addition, graphics orders typically include, or point to, data defining normal vectors for the vertices of each primitive. The values of these coordinates and normal vectors are typically specified in the world coordinate system.

In addition, the transformation of the primitives of the model from the local coordinate system to a world coordinate system may not be performed by the application executing on the host processor, but may be performed by the graphics subsystem. In this case, the graphics order supplied to the graphics subsystem includes, or points to the transformation matrices stored in the system memory 104, and the graphics subsystem utilizes the transformation matrices to transform the primitives of the model from the local coordinate system to a world coordinate system.

Although the graphics subsystem 110 is illustrated as part of a graphics work station, the scope of the present invention is not limited thereto. Moreover, the graphics subsystem 110 of the present invention as described below may be implemented in hardware such as a gate array or a chip set that includes at least one programmable sequencer, memory, at least one integer processing unit and at least one floating point processing unit, if needed. In addition, the graphics subsystem 110 may include a parallel and/or pipelined architecture as shown in U.S. Pat. No. 4,876,644, commonly assigned to the assignee of the present invention and incorporated by reference herein in its entirety.

In the alternative, the graphics subsystem 110 (or portions thereof) as described below may be implemented in software together with a processor. The processor may be a conventional general purpose processor, the host processor 128, or a co-processor integrated with the host processor 128.

As shown in FIG. 3, the graphics subsystem 110 includes a control unit 200 that supervises the operation of the graphics subsystem 110. Upon receiving a graphics order to render a model, the control unit 200 passes the graphics data associated with the graphics order on to a geometry engine 202. The geometry engine 202 transforms the graphics data associated with the graphics order from the world coordinate system to a 3D screen coordinate system (sometimes referred to as a normalized projection coordinate system), clips the graphics data against a predetermined view volume, and transforms the clipped data from the 3D screen coordinate system to a normalized device coordinate system (sometimes referred to as the 2D device coordinate system or the screen coordinate system). In addition, depending upon the shading algorithm to be applied, an illumination model is evaluated at various locations (i.e., the vertices of the primitives and/or the pixels covered by a given primitive). The transformed and clipped graphics data defined by coordinates in the normalized device coordinate system is then passed on to a rasterization stage 212.

The rasterization stage performs scan conversion thereby converting the transformed primitives into pixels, and performs shading calculations and visibility determination which generally stores each primitive's contribution at each pixel in at least one frame buffer 216 and a z-buffer 214. The Z-buffer 214 preferably contains sufficient memory to store a depth value for each pixel of the display 112. Conventionally, the depth value is stored as a 24-bit integer for each pixel. The frame buffer 216 preferably contains sufficient memory to store color data for each pixel of the display 112. Conventionally, the color data consists of three 8-bit integers representing red, green and blue (r,g,b) color values for each pixel. The pixel data is periodically output from the frame buffer 216 for display on the display device 112. The functionality of the geometry engine 202 and rasterization stage 212 may be organized in a variety of architectures. A more detailed discussion of such architectures may be found in Foley et. al., "Computer Graphics: Principles and Practice", pp. 855–920 (2nd Ed. 1990), herein incorporated by reference in its entirety.

According to the present invention, a mechanism is provided that constructs a simplified approximation of one or more objects of a model to produce a simplified model. The mechanism may be executed on an original non-simplified model. In the alternative, the mechanism may be executed on a simplified model and thus employ the result of a previous simplification as the starting point for subsequent simplification. Preferably, the mechanism of the present invention is integrated into the application software that is loaded from non-volatile storage to the system memory 104 where it is executed by the system processor 102. In addition, the mechanism may be contained in a graphics library that is part of an application developers kit.

Figure 13A:
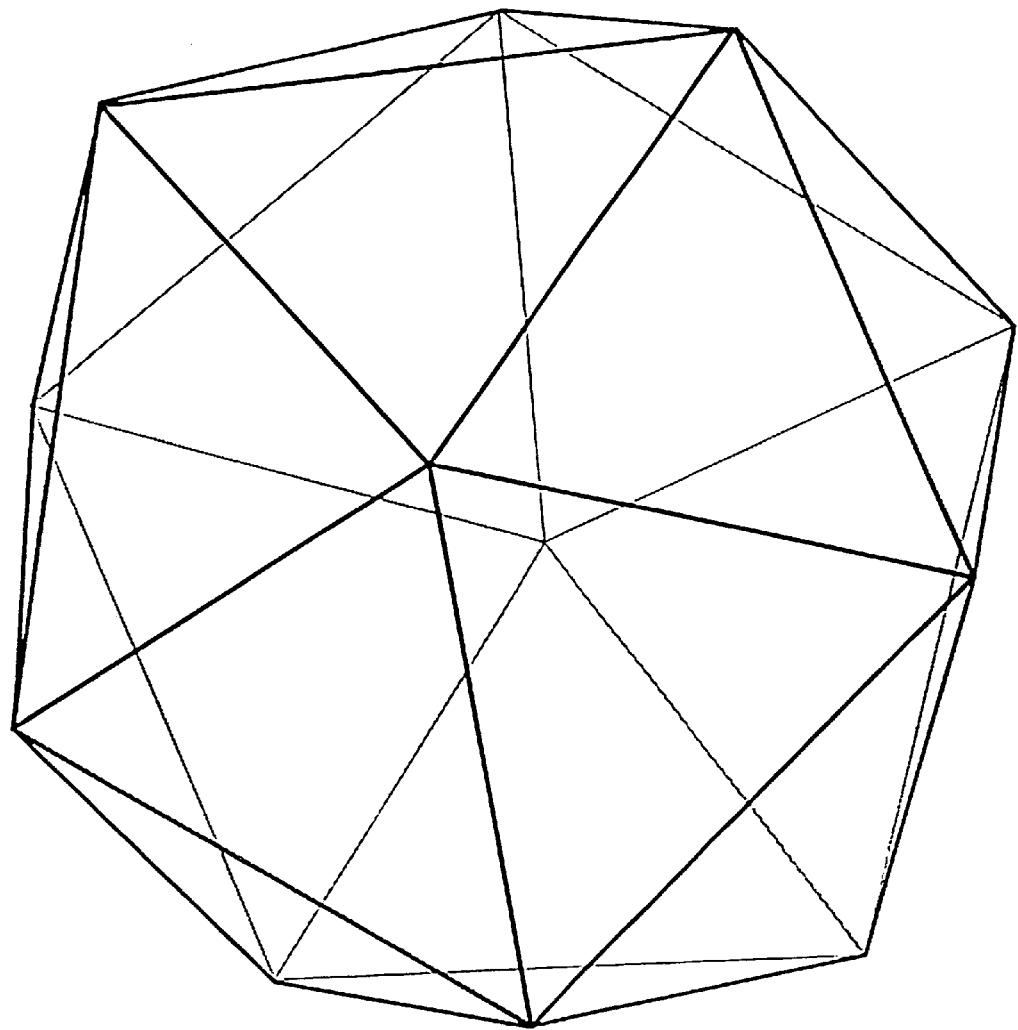
FIG. 13(A) is a pictorial representation of a solid.
Figure 13B:
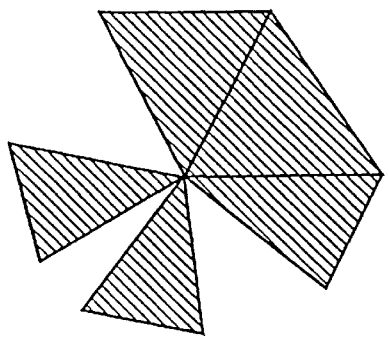
FIG. 13(B) is a pictorial representation of a star of a vertex.
Figure 13C:
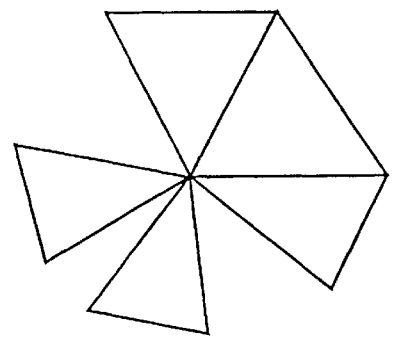
FIG. 13(C) is a pictorial representation of a link of a vertex.
Figure 13D:
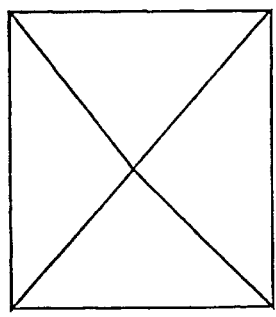
FIG. 13(D) represents a regular vertex.
Figure 13E:
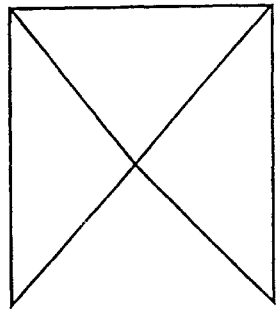
FIG. 13(E) represents a boundary vertex.

Generally, the simplification mechanism of the present invention is best suited for producing simplifications of solid objects that enclose the exact same volume as the original solid object. An example of a solid is shown in FIG. 13(A). A definition of a solid can be found in C. Hoffmann's "Geometric and Solid Modeling", Morgan Kaufmann, 1989, pp 51–65, herein incorporated by reference in its entirety. A solid may be partitioned into two classes: "solid without boundary" and "solid with boundary". A "solid without boundary" is made exclusively of regular vertices as set forth below. A "solid with boundary" is made of regular vertices and at least three boundary vertices. An example of a regular vertex is shown in FIG. 13(D). An example of a boundary vertex is shown in FIG. 13(E). The simplification mechanism may be utilized with both classes of solids.

Figure 13F:
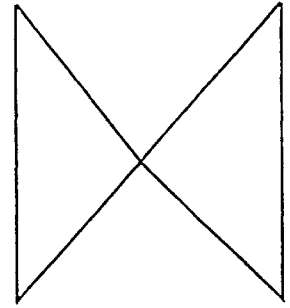
FIG. 13(F) represents a singular vertex.

Moreover, the simplification mechanism of the present invention is best suited for triangles that satisfy the following properties: each pair of triangles is either non-intersecting or intersects exactly at a vertex of each of them or at an edge of each of them. At each vertex, the link must be a simple polygonal curve ( the set of triangles that share that vertex can be ordered). If furthermore, the link is a simple closed polygonal curve, then the vertex is said to be a "regular vertex". An example of a link of a vertex is shown in FIG. 13(C). If the link is a simple open polygonal curve, then the vertex is said to be on the boundary, or a "boundary vertex". Any vertex that is neither regular nor boundary is a "singular vertex". An example of a singular vertex is shown in FIG. 13(F). A more detailed description of a link may be found at C. Hoffmann's "Geometric and Solid Modeling", Morgan Kaufmann, 1989, pp 53–54. However, it should be understood that such constraints placed upon on the modeling geometry is not to be construed in a limiting sense upon the practice of the present invention.

The simplification mechanism of the present invention preferably stores in system memory 104 a list of vertices 300, a list of triangles 400 and a list of edges 500. It should be realized that these particular data structures are not to be construed in a limiting sense upon the practice of the present invention.

Figure 4:
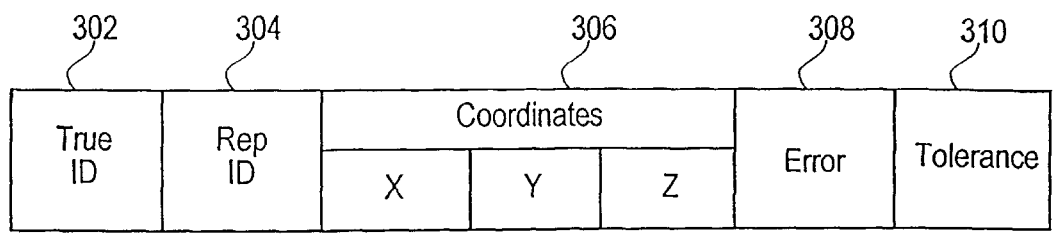
FIG. 4 is a pictorial illustration of an entry in the list of vertices used by the preferred embodiment of the present invention.

The list of vertices 300 include an entry associated with each vertex of the triangles that represent the object(s) of a model. As shown in FIG. 4, each entry preferably includes a true ID field 302, a representative ID field 304, coordinate fields 306 associated with a given vertex. In addition, the entry may include an error field 308 and a tolerance field 310 associated with the given vertex. The functionality of the error field 308 and tolerance field 310 is discussed below with respect to FIG. 16. The coordinate fields 306 store the coordinates (such as the x,y,z coordinates) of the given vertex. The true ID field 302 stores an identifier assigned to the given vertex. And the representative ID field 304 stores an identifier that points to a vertex that represents the given vertex. Preferably, the representative ID field 304 is initialized to point to the given vertex and thus initially stores the same value as the true ID field 304. However, as described in more detail below, when the simplification mechanism of the present invention collapses an edge, a simplified vertex replaces the vertices of the edge. Preferably, the simplified vertex is added to the list of vertices by:

a) updating the coordinates fields 306 for one vertex of the collapsed edge; and b) updating the representative ID field 304 for the other vertex of the collapsed edge to point to the other/moved vertex of the collapsed edge.

It should be noted that the entries of the list of vertices may exclude the true ID field 302 if the identifier assigned to the given vertex/entry corresponds to the location of the entry in the list of vertices. In other words, the true ID field 302 is implicitly assigned to the entry in this case.

Figure 5:
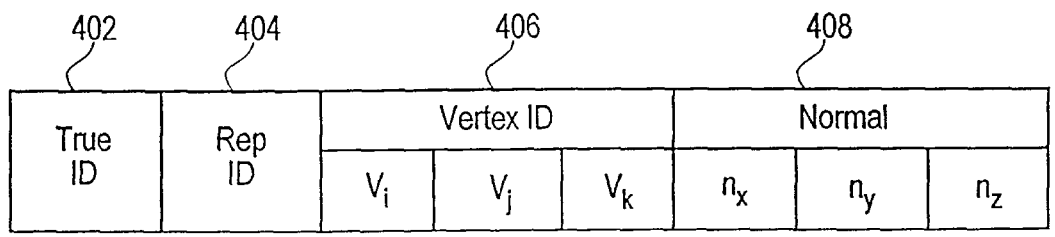
FIG. 5 is a pictorial illustration of an entry in the list of triangles used by the preferred embodiment of the present invention.

The list of triangles 400 include an entry associated with each triangle that represents the object(s) of a model. As shown in FIG. 5, each entry preferably includes a true ID field 402, a representative ID field 404, vertex identifier fields 406, and normal fields 408 that are associated with a given triangle . The normal fields 408 store data that represents components of the surface normal (such as the nx,ny,nz components) at the given triangle. Such a surface normal is typically used during rasterization for lighting calculations. The vertex identifier fields 406 preferably identify the vertices vi,vj,vk of the associated triangle prior to simplification. Thus, the vertex identifier fields 406 preferably store the value of the true ID field 302 for the vertices vi,vj,vk. Preferably, the vertex identifier fields 406 for the vertices vi,vj,vk are ordered by convention, for example, by a convention wherein the vertices vi,vj,vk are oriented sequentially in a counter-clockwise fashion. The true ID field 402 stores an identifier assigned to the given triangle. And the representative ID field 404 stores an identifier that points to a triangle that represents the given triangle. Preferably, the representative ID field 404 is initialized to point to the given triangle and thus initially stores the same value as the true ID field 404. However, as described in more detail below, when the simplification mechanism of the present invention collapses an edge, the two triangles that share the collapsed edge are replaced by representative triangles. Preferably, the two triangles that share the collapsed edge are replaced by representative triangles by updating the representative ID field 404 for the replaced triangles. In addition, for each triangle that shares one of the vertices of the collapsed edge (except for the two replaced triangles that share the collapsed edge), new surface normals are computed for the given triangle and the normal data 408 associated with the given triangle is updated. It should be noted that the entries of the list of triangles may exclude the true ID field 402 if the identifier assigned to the given triangle/entry corresponds to the location of the entry in the list of triangles. In other words, the true ID field 402 is implicitly assigned to the entry in this case.

Figure 6:
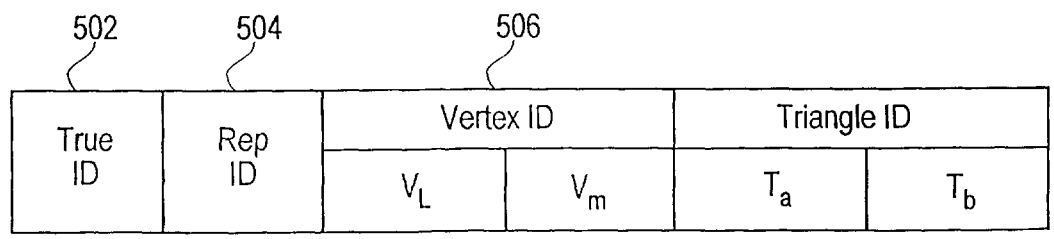
FIG. 6 is a pictorial illustration of an entry in the list of edges used by the preferred embodiment of the present invention.

The list of edges 500 include an entry associated with each edge that represents the triangles of the object(s) of a model. As shown in FIG. 6, each entry preferably includes a true ID field 502, a representative ID field 504, vertex identifier fields 506, and triangle identifier fields 508 that are associated with a given edge. The vertex identifier fields 506 preferably identify the vertices vl,vm of the given edge prior to simplification. Thus, the vertex identifier fields 506 preferably store the value of the true ID field 302 for the vertices vl,vm. Preferably, the vertex identifier fields 506 for the vertices vl,vm of the given edge are ordered by convention, for example, by the convention where the value stored by the true ID field 302 for vertex vl is greater than the value stored by the true ID field 302 for the vertex vm. The triangle identifier fields 508 preferably identify the triangles Ta,Tb that share the given edge prior to simplification. Thus, the triangle identifier fields 508 preferably store the value of the true ID field 402 for the triangles Ta,Tb. Preferably, the triangle identifier fields 508 are ordered by convention, for example, by a convention wherein the triangles Ta and Tb are oriented sequentially in a clockwise sense with respect to the vertex vl identified by the vertex identifier fields 506. The true ID field 502 stores an identifier assigned to the given edge. And the representative ID field 504 stores an identifier that points to an edge that represents the given edge. Preferably, the representative ID field 504 is initialized to point to the given edge and thus initially stores the same value as the true ID field 504. However, as described in more detail below, when the simplification mechanism of the present invention collapses an edge, edges that neighbor the collapsed edge may be replaced by representative edges. Preferably, the neighbor edges are replaced by representative edges by updating the representative ID field 504 for the replaced edges. It should be noted that the entries of the list of edges may exclude the true ID field 502 if the identifier assigned to the given edge/entry corresponds to the location of the entry in the list of edges. In other words, the true ID field 502 is implicitly assigned to the entry in this case.

In addition, the simplification mechanism of the present invention preferably stores in system memory 104 a priority queue 600 which represents a list of edges ordered by priority. The priority queue allows the simplification mechanism of the present invention to make one pass through the edges of the model when constructing the simplified model. The priority of a given edge is determined by the value of a key associated with the edge. The value of the key associated with a given edge is preferably based upon the length of the given edge plus the sum of the error values associated with the vertices of the given edge. A more detailed description of such error values is set forth below. And, a more detailed description of the priority queue 600 may be found in Cormen et al., "Introduction to Algorithms", McGraw Hill, 1994, pp. 149–151, herein incorporated by reference in its entirety.

Figure 7A:
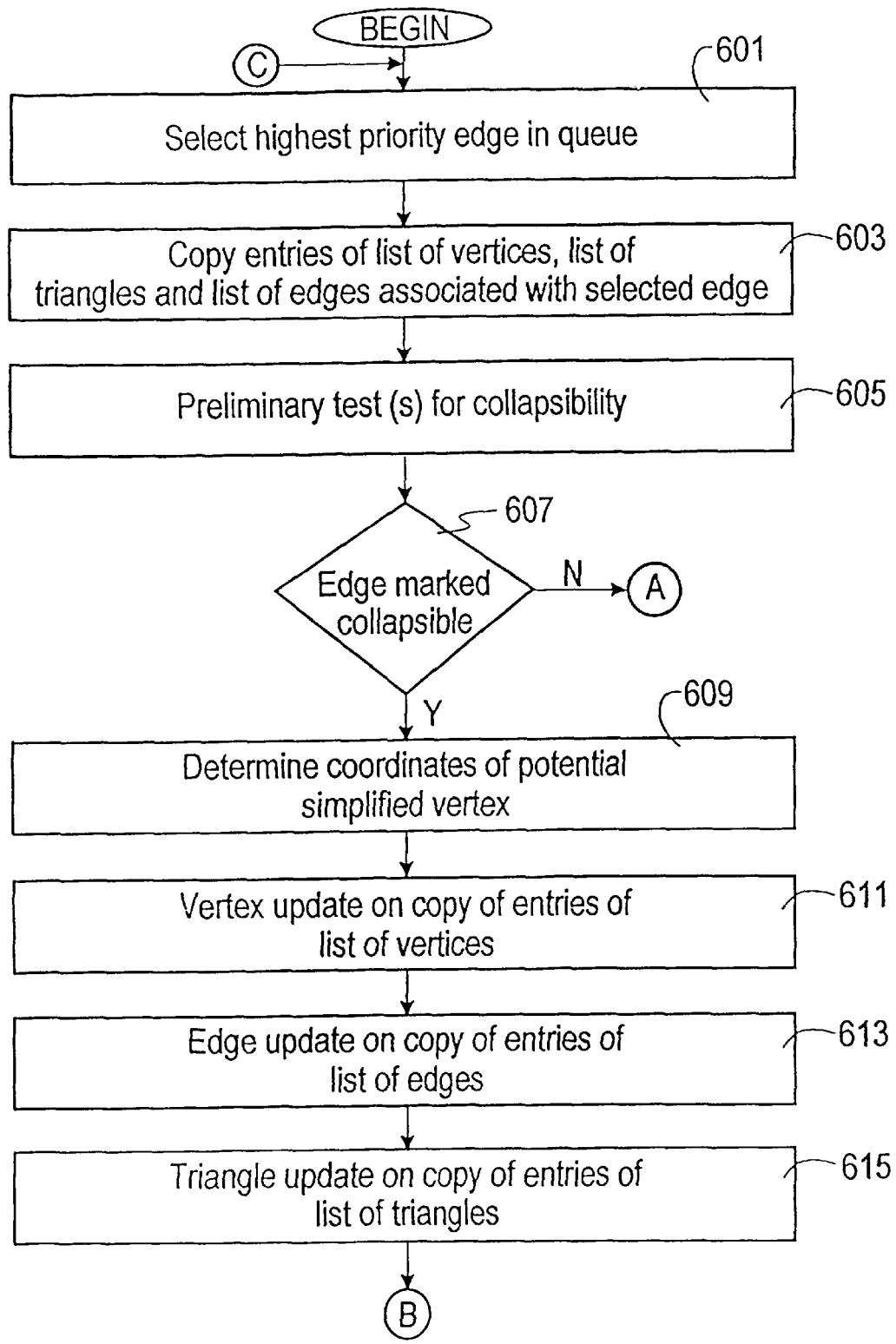
FIG. 7 is a flow chart illustrating the simplification technique of the present invention.
Figure 7B:
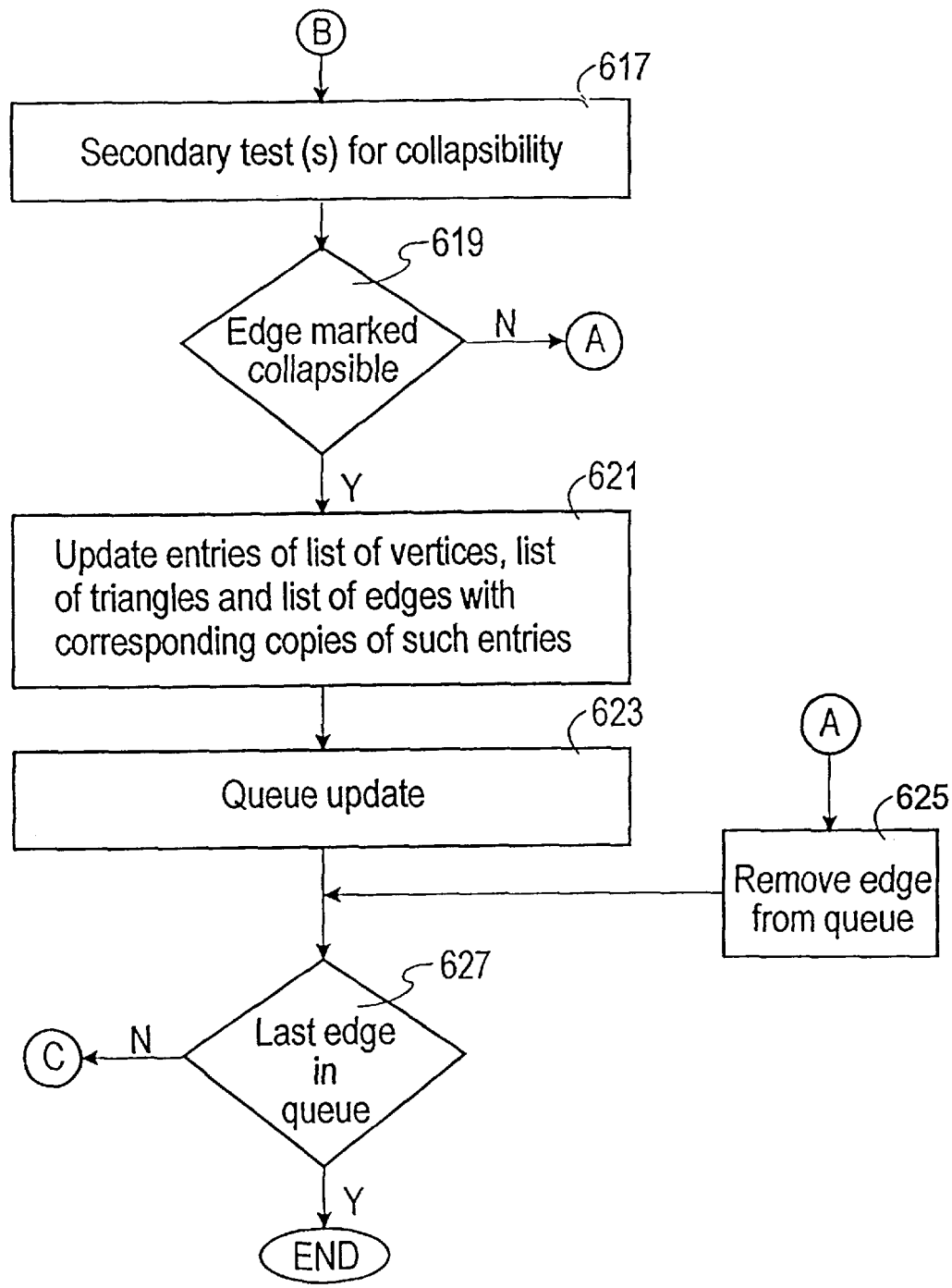

FIGS. 7(A)–(B) is a flow chart that illustrates the simplification techniques employed by the present invention. In step 601, the edge with the highest priority is selected from the priority queue 600. In step 603, a copy is made of entries in the list of triangles 400 associated with the triangles of an edge star that corresponds to the edge selected in step 601. A more detailed description of an edge star is set forth below with respect to step 1105 of FIG. 11. In addition, a copy is made of the entries of the list of vertices 300 and list of edges 500 that belong to one or more triangles of the edge star.

In step 605, one or more preliminary collapsibility tests are performed with respect to the selected edge. A more detailed description of the preliminary collapsibility test(s) for the selected edge is describe below with respect to FIG. 11. The preliminary collapsibility test(s) determines whether or not the edge is collapsible, and appropriately marks a flag indicating the collapsibility of the edge. In step 607, it is determined if the flag indicates that the edge is collapsible. If the edge is collapsible, operation continues to step 609; however, if the edge is not collapsible (i.e., failed the preliminary collapsibility test(s)), operation continues to step 625.

Figure 8:
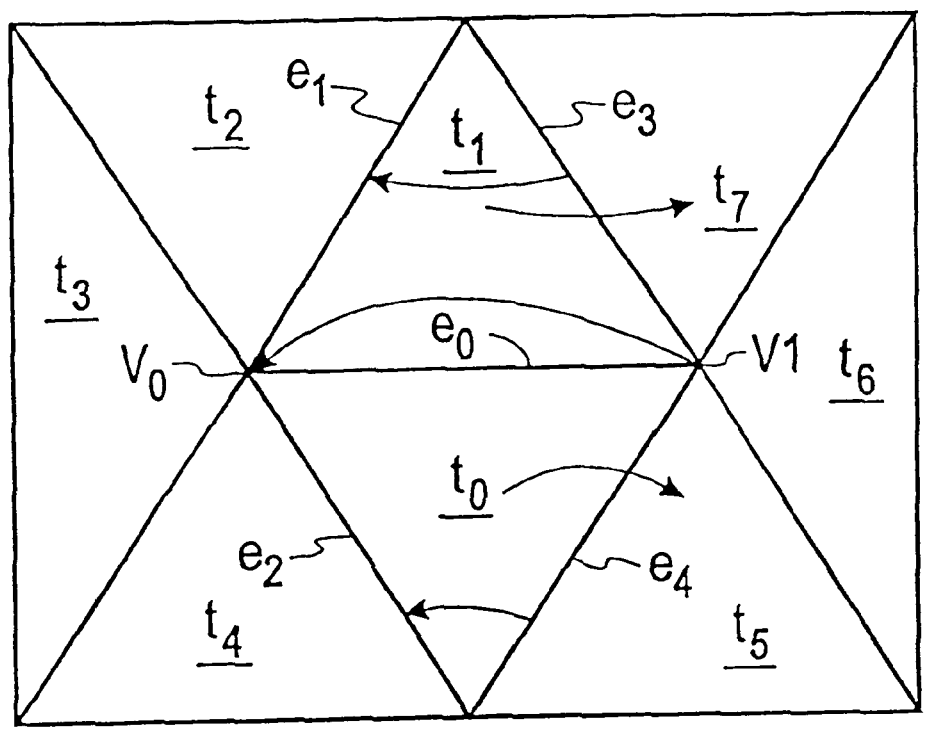
FIG. 8 is a pictorial illustration of a collapsible edge and the resulting operations.

In step 609, the coordinates of a potential simplified vertex corresponding to the selected edge is identified and operation continues to steps 611–613. A more detailed description of the preferred operation of the system in determining the coordinates of the potential simplified vertex is set forth below with respect to FIG. 12. Steps 611–613 are described below with respect to FIG. 8 which illustrates an example of a collapsible edge and the resulting operations. In FIG. 8, triangles t0 and t1 share edge e0, which has been selected as the collapsible edge.

In step 611, a vertex update operation is performed on the copy of the entries of the list of vertices generated in step 603. More specifically, one vertex v0 of the selected edge e0 is selected and the coordinate fields 306 of the copy of the entry in the list of vertices 300 that corresponds to the selected vertex v0 is updated to correspond to the coordinates of the simplified vertex (not shown). In addition, the representative ID field 304 of the copy of the entry in the list of vertices 300 that corresponds to the other vertex v1 of the selected edge e0 is updated to point to the selected vertex v0.

In step 613, an edge update operation is performed on the copy of the entries of the list of edges generated in step 603 wherein two edges that neighbor the selected edge are replaced by representative edges. Preferably, the replaced neighboring edges are those edges that share the replaced vertex and are part of the replaced triangles. For example, edges e3 and e4 (which share the replaced vertex v1 and are part of the replaced triangles t0,t1) may be replaced by representative edges e1 and e2, respectively. In this example, the neighbor edges e3 and e4 are preferably replaced by the representative edges e1 and e2 by updating the representative ID field 504 of the copy of the entries of the list of edges that correspond to the replaced edges e3 and e4 to point to the true ID fields 502 associated with the edges e1 and e2, respectively.

In step 615, a triangle update operation on the copy of entries of the list of triangles generated in step 603 wherein two triangles t0 and t1 that share the collapsed edge e0 are replaced by representative triangles. Preferably, the representative triangles are those triangles that include the edges replaced in step 607. For example, triangles t0 and t1 may be replaced by representative triangles t5 and t7, respectively. In this example, the triangles t0 and t1, are replaced by the representative triangles t5 and t7 by updating the representative ID field 404 of the copy of the entries of the list of triangles that correspond to the replaced triangles t0 and t1 to point to the true ID fields 402 associated with the triangles t5 and t7, respectively. In addition, for each triangle that shares one of the vertices of the selected edge e0 (except for the two replaced triangles that share the selected edge e0), new surface normals are computed for the given triangle and the normal data 408 associated with the copy of the entry in the list of triangles that corresponds to the given triangle is updated. In the example shown, new surface normals would be computed for the triangles t2,t3,t4,t5,t6,t7, and would not be computed for the triangles t0,t1.

In step 617, one or more secondary collapsibility tests are performed with respect to the selected edge. A more detailed description of the secondary collapsibility test(s) for the selected edge is described below with respect to FIG. 15. The secondary collapsibility test(s) determines whether or not the edge is collapsible, and appropriately marks the flag indicating the collapsibility of the edge. In step 619, it is determined if the flag indicates that the edge is collapsible. If the edge is collapsible, operation continues to step 621; however, if the edge is not collapsible (i.e., failed the secondary collapsibility test(s), operation continues to step 625.

In step 621, the list of vertices 300, list of triangles 400 and list of edges 500 are updated with the corresponding copy of such entries. This operation updates such lists to reflect the simplification that results from collapsing the selected edge.

In step 623, a priority queue update operation is performed whereby entries that correspond to the edges replaced in step 613 are removed from the queue 600. In addition, those entries of the priority queue 600 that correspond to edges having as a vertex one of the vertices of the collapsed edge (in this example edges e1 and e2) are selected and the priority for the selected entry is updated. After step 623, operation continues to step 627.

In step 625, the selected edge is removed from the priority queue 600 and the processing continues to 627.

In step 627, it is determined if the last edge in the priority queue 600 has been processed. If not, operation returns to step 601 to process the highest priority edge in the priority queue 600. If so, the simplification operation ends.

Figure 9A:
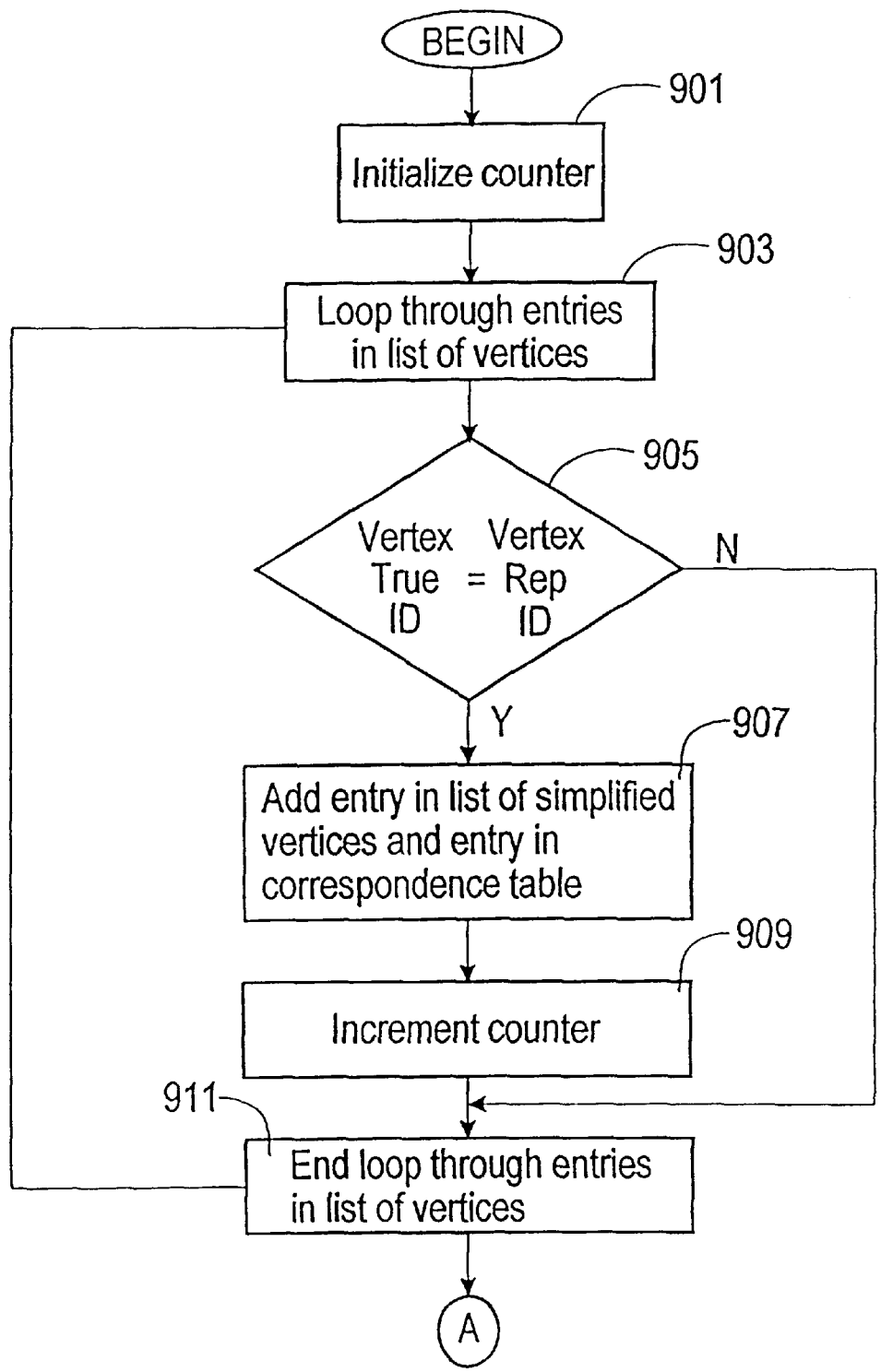
FIGS. 9(A)–(C) is a flow chart illustrating the rendering of a simplified model according to the present invention.
Figure 9B:
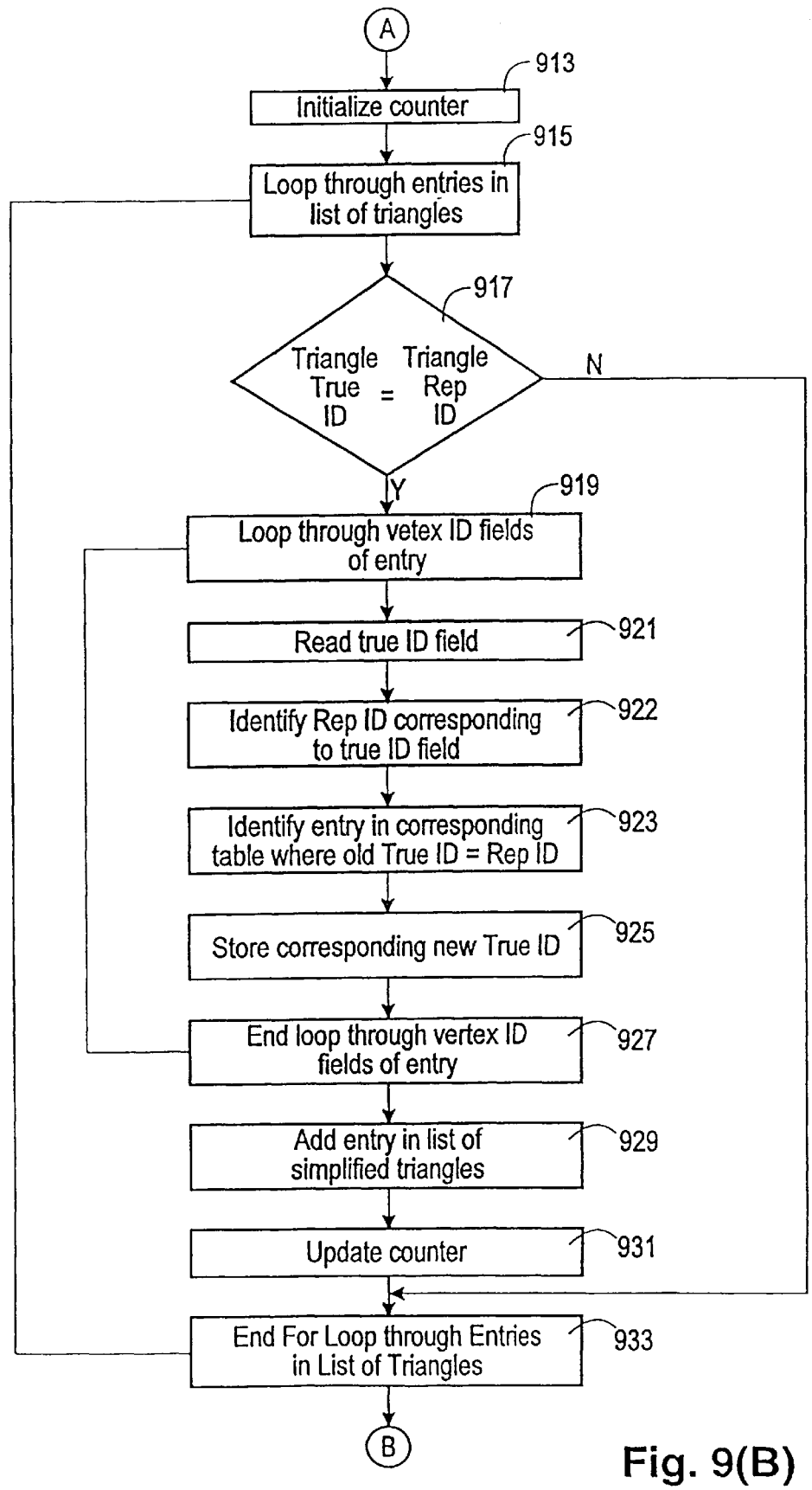
Figure 9C:
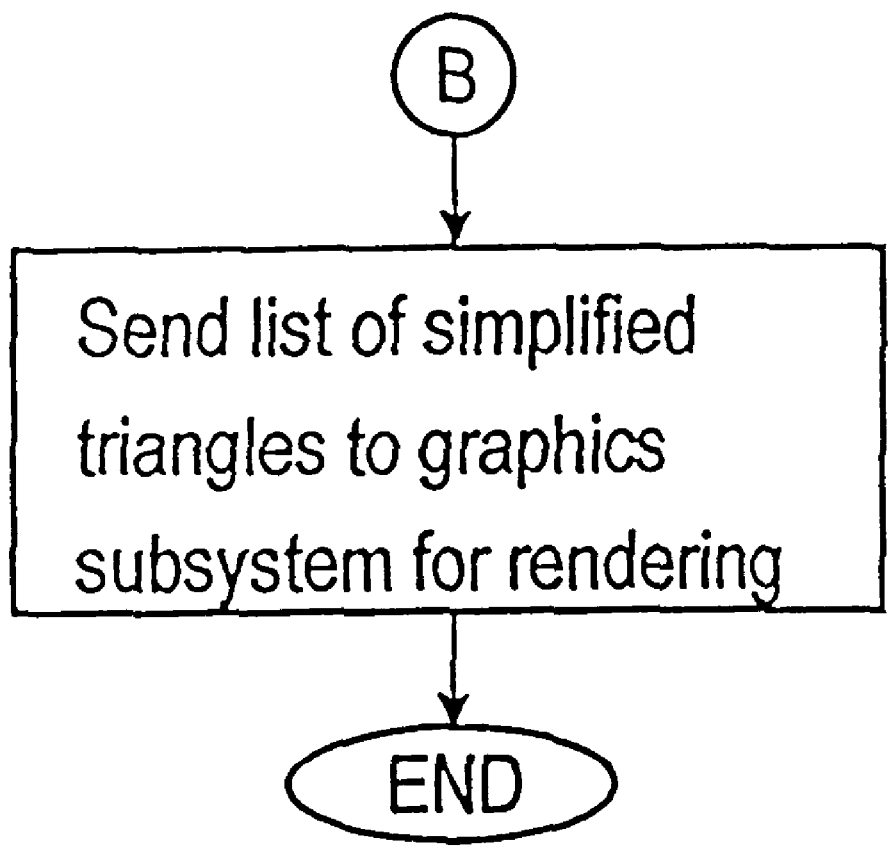

FIGS. 9(A)–(C) illustrates the operation of the graphics system in rendering the simplified model generated with the simplification techniques set forth above with respect to FIG. 7. The rendering operation first loops through the list of vertices 300 to build a list of simplified vertices 300a and a correspondence table 900. The list of simplified vertices 300a excludes entries associated with vertices removed in step 605 above. The operation then loops through the list of triangles 400 to build a list of simplified triangles 400a, which excludes entries associated with triangles removed in step 609 above. The generation of the list of simplified triangles 400a utilizes the list of simplified vertices 300a and the correspondence table 900. The list of simplified triangles 400a is then forwarded to the graphics subsystem 110 wherein the simplified triangles are rendered for display.

More specifically, the rendering operation begins in step 901 by initializing a counter, for example to a zero value. The operation then performs a loop 903–911 through the entries in the list of vertices 300. For each entry in the list of vertices 300, the operation performs steps 905–909. In step 905, it is determined if the true ID field 302 of entry is equal to the representative ID field 304 of the entry. This step identifies whether or not the particular entry is associated with a vertex removed in step 611 above. If in step 905 it is determined that the true ID field 302 of entry is equal to the representative ID field 304 of the entry, operation continues to step 907; otherwise operation continues to the next entry in the list of vertices 300. In step 907, an entry is added to the list of simplified vertices 300a at a location corresponding to the current counter, and an entry is added to the correspondence table 900. Finally, in step 909 the counter is incremented and operation continues to the next entry in the loop 903–911.

Figure 10:
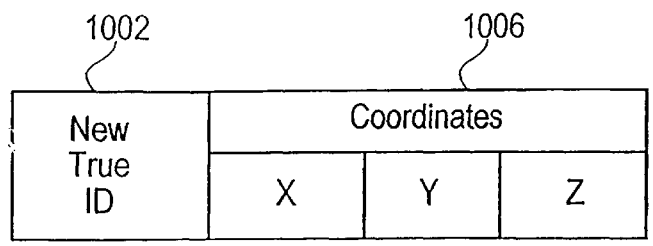
FIGS. 10(A)–(C) is a pictorial illustration of the data structures used by the preferred embodiment of the present invention in representing the simplified model.
Figure 10:
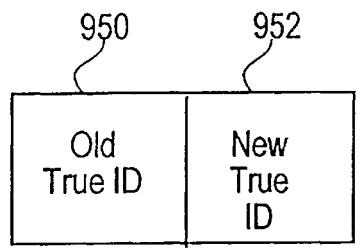
Figure 10:
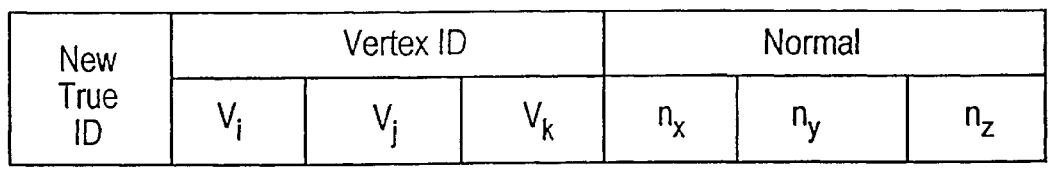

As shown in FIG. 10(A), the entry in the list of simplified vertices 300a preferably includes new true ID field 1002 and coordinate fields 1006 associated with the given vertex. The new true ID field 1002 stores a new identifier assigned to the vertex after simplification. The new identifier is preferably set to the current value of the counter. The coordinate fields 1006 store the coordinates (such as the x,y,z coordinates) of the given vertex, and thus store the same data as the corresponding entry in the list of vertices 300. It should be noted that the entries of the list of simplified vertices may exclude the new true ID field 1002 if the identifier assigned to the given vertex/entry corresponds to the location of the entry in the list of simplified vertices 1002. In other words, the new true ID field 1002 is implicitly assigned to the entry in this case.

As shown in FIG. I O(B), the entry in the correspondence table 900 preferable includes an old true ID field 950 and new true ID field 952 which encode the correspondence between the identifiers assigned to the given vertex before and after simplification. More specifically, the old true ID field 950 stores the value of the identifier stored in the true ID field 302 in the corresponding entry in the list of vertices 300. The new true ID field 952 stores the new identifier assigned to the given vertex, and thus stores the same data as the new true ID field 1002 of the corresponding entry in the list of simplified vertices 300a as shown in FIG. 10(A). It should be noted that the entries of the correspondence table 900 may exclude the old true ID field 950 if the old identifier assigned to the given vertex/entry corresponds to the location of the entry in the correspondence table 900. In other words, the old true ID field 950 is implicitly assigned to the entry in this case.

After completing the loop 903–911, operation continues to step 913 wherein a counter is initialized, for example to a zero value. The operation then performs a loop 915–933 through the entries in the list of triangles 400. For each entry in the list of triangles 400, the operation performs steps 917–931. In step 917, it is determined if the true ID field 402 of entry is equal to the representative ID field 404 of the entry. This step identifies whether or not the particular entry is associated with a triangle removed in step 615 above. If in step 917 it is determined that the true ID field 402 of entry is equal to the representative ID field 404 of the entry, operation continues to step 919; otherwise operation continues to the next entry in the list of triangles 400. In step 919, a loop 919–927 is performed for the vertex ID fields 406 of the entry. For each vertex ID, the operation performs steps 921–925. In step 921, the vertex ID is read from the appropriate vertex ID field 406. As described above with respect to FIG. 4, the vertex ID field points to the true ID field 302 of a vertex/entry in the list of vertices 300. In step 922, the representative identifier field 304 is read from the entry in the list of vertices 300 whose true identifier field 302 corresponds to the value stored by vertex ID field read in step 921. In step 923, the entry of the correspondence table 900 whose old true ID field 950 matches the representative identifier field 304 read in step 922 is identified. Finally, in step 925 the value stored in the new true ID field 952 for the entry of the correspondence table 900 identified in step 923 is stored. After looping through the vertex ID fields 406 of the entry in the list of triangles 400, in step 929 an entry is added to the list of simplified triangles 400a at a location corresponding to the current counter.

As shown in FIG. 10(C), the entry in the list of simplified triangles 400a preferably includes new true ID field 1012, vertex identifier fields 1014, and normal fields 1016 associated with the given triangle. The true ID field 1012 stores a new identifier assigned to the given triangle. The new identifier is preferably set to the current value of the counter. The vertex identifier fields 1016 identify the vertices of the associated triangle after simplification. Thus, the vertex identifier fields 1016 preferably store the new true ID values stored in step 925. Finally, the normal fields 1018 store data that represents components of the surface normal (such as the nx,ny,nz components) at the given triangle, and thus store the same data as the corresponding entry in the list of triangles 400. It should be noted that the entries of the list of simplified triangles 400a may exclude the true ID field 1012 if the identifier assigned to the given triangle/entry corresponds to the location of the entry in the list of simplified triangles. In other words, the true ID field 1012 is implicitly assigned to the entry in this case.

In step 931, the counter is incremented and operation continues to the next entry in the loop 915–933.

After completing the loop 915–933, operation continues to step 935. In step 935, the list of simplified triangles 400a is communicated to the graphics subsystem wherein the simplified triangles are rendered for display.

A more detailed description of the preliminary collapsibility test(s) of step 605 outlined above is now set forth with reference to FIG. 11. As described below, such preliminary tests may include one of more of a boundary test, a valence test and a manifold test. Preferably, the preliminary collapsibility test operation begins in step 1101 by performing a boundary test with respect to the selected edge. The boundary test determines if any of the vertices of the selected edge is a boundary vertex. A detailed description of a boundary vertex is set forth above. If in step 1101 it is determined that one or more of the vertices of the selected edge is a boundary vertex, then the selected edge is marked as not collapsible and the operation ends; otherwise the operation continues to step 1103.

In step 1103, a valence test may be performed with respect to the selected edge. The valence of a vertex is the number of triangles that share that vertex. The valence of an edge is represented by the sum of the valence of the vertices of the edge. Preferably, the valence test of step 1103 determines whether the valence of the edge falls within a predetermined bound. For example, the valence test may be represented as follows:

$$3 \leq (v(v_1)+v(v_2))-4) \leq \text{valence}_{max}$$

where $v(v_1)$ and $v(v_2)$ represents the valence of two vertices of the edge, and $\text{valence}_{max}$ is a predetermined integer value that may be specified by the user.

If in step 1103 it is determined that the valence associated with selected edge falls outside the predetermined bounds, the selected edge is marked as not collapsible and the operation ends; otherwise the operation continues to step 1105.

In step 1105, the edge star of the selected edge is constructed. The edge star represents a union of the stars of the vertices of the selected edge. A more detailed description of the star of a vertex is described in R. Ronfard and R. Rossignac, "Full-Range Approximation of Triangulated Polyhedra", Computer Graphics Forum, Vol. 15, 1996, pp. 67–76, herein incorporated by reference in its entirety. An example of a star is shown in FIG. 13(B).

In step 1107, a manifold test may performed to ensure that the vertices of the link of the edge star constructed in step 1105 are different. The link of an edge star is equivalent to the link of a vertex formed by collapsing the edge. A detailed description of the link of a vertex is set forth above. If the manifold test fails, the edge is marked as not collapsible and the operation ends; otherwise the operation ends.

Figure 12:
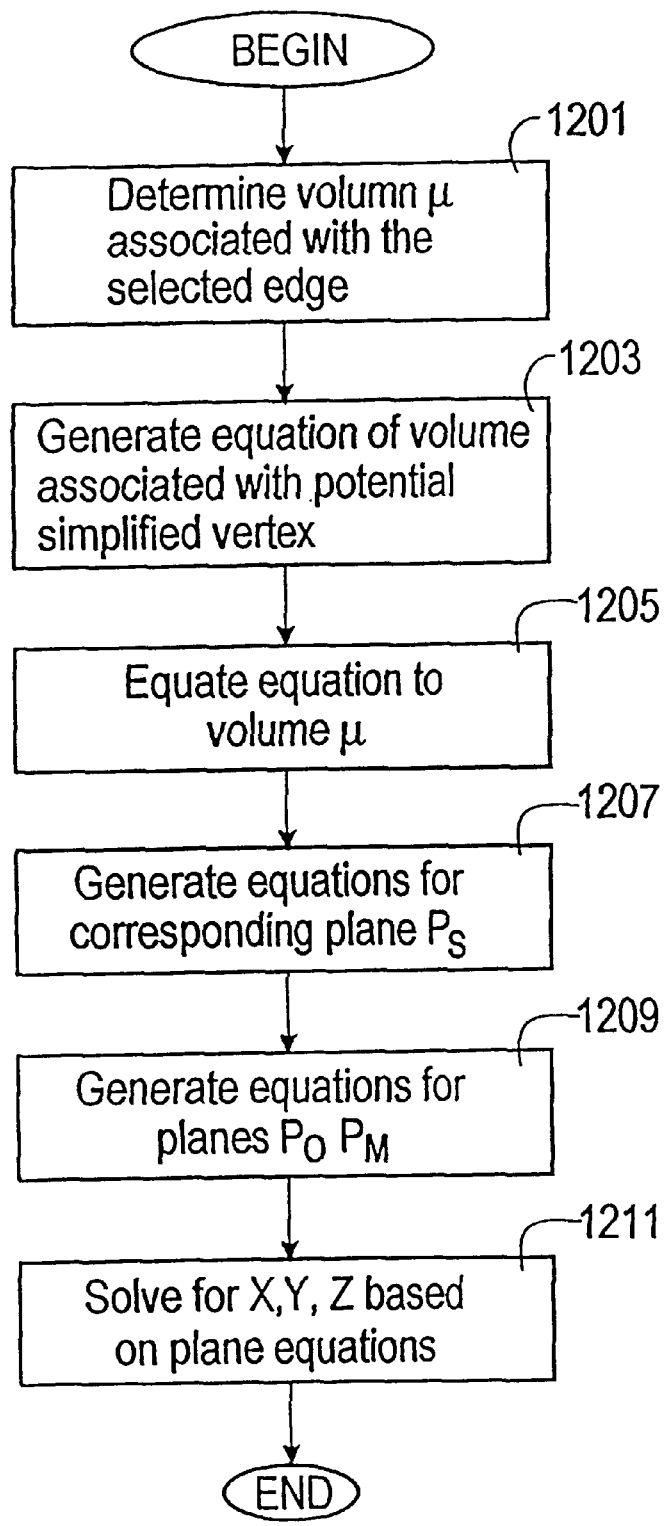
FIG. 12 is a flow chart illustrating the operations in determining the coordinates of the potential simplified vertex according to the present invention.
Figure 13G:
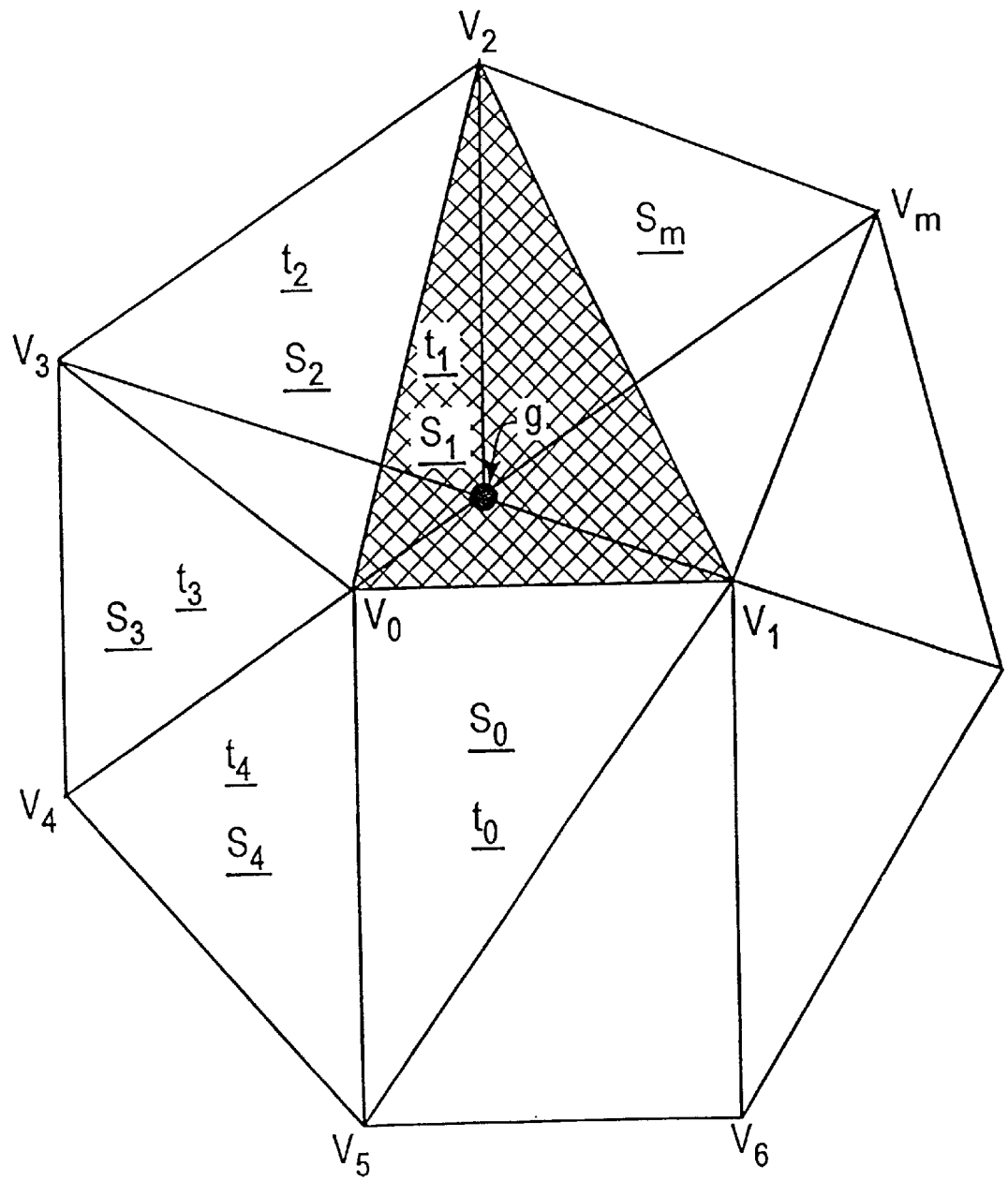
FIG. 13(G) is a pictorial representation of an edge star before simplification.

A more detailed description of the preferred steps in determining the coordinates of the potential simplified vertex is now set forth with reference to FIG. 12. These steps advantageously place the simplified vertex in a specific location such that a volume associated with the edge prior to simplification (i.e. prior to edge collapse) will remain unaltered after simplification (i.e., after edge collapse). More specifically, the operation begins in step 1201 by defining a volume v associated with the selected edge. Preferably the volume v is determined as follows. First, the coordinates gx,gy,gx of a point in the vicinity of the set of vertices in the edge star of the selected edge. Preferably, the point gx,gy,gz is the centroid of the set of vertices of the edge star. Alternatively, the point gx,gy,gz may be assigned to the midpoint between the vertices of the collapsed edge or other similar coordinates. Second, the tetrahedra $s_0, s_1, s_2 \ldots s_m$ are identified, where (m+1) is the number of triangles in the edge star of the selected edge, and wherein the vertices of a given tetrahedron $s_i$ include the three vertices of the corresponding triangle $t_i$ and the point gx,gy,gz. For example, as shown in FIG. 13(G), the four vertices of the tetrahedron s1 (cross-hatched) include the three vertices v0,v1,v2 as well as the point g. Finally, the volume v is calculated as the sum of the volumes of the tetrahedra $s_0, s_1, s_2 \ldots s_m$. The volume of a given tetrahedron $s_i$, which is defined by the vertices (g,vi,vj,vk), is preferably determined by applying a translation T to the vertices (vi,vj,vk) and by computing (⅙) of the determinant of the following matrix m:

$$m = \begin{bmatrix} vix & vjx & vkx \\ viy & vjy & vky \\ viz & vjz & vkz \end{bmatrix}$$

wherein vix,viy, viz denote the translated x y z coordinates of the vertex vi, wherein vjx, vjy, vjz denote the translated x y z coordinates of the vertex vj, and wherein vkx, vky, vkz denote the translated x y z coordinates of the vertex vk.

Preferably, the parameters Tx,Ty,Tz of the translation T are set to (-gx,-gy,-gz) of the point g. The determinant of m is preferably calculated by first performing a QR Decomposition of the matrix m (See Golub and Van Load, "Matrix Computations", Johns Hopkins Press, 1989, pp 211 ff), which results in the decomposition m=qr, and then by multiplying together the diagonal elements of r.

In step 1203, the potential simplified vertex is assumed to have the coordinates x,y,z, and an equation is generated that represents a volume associated with the potential simplified vertex. Preferably, the equation is generated as follows. First, the tetrahedra $r_2, r_3, \ldots r_{m-1}, r_m$ are identified as follows:

$$r_2 = (g, vs, v2, v3)$$

$$r_3 = (g, vs, v3, v4)$$

$$r_4 = (g, vs, v4, v5)$$

$$r_5 = (g, vs, v5, v6)$$

$$r_{m-1} = (g, vs, vm-1, vm)$$

$$r_m = (g, vs, vm, v2)$$

Figure 14:
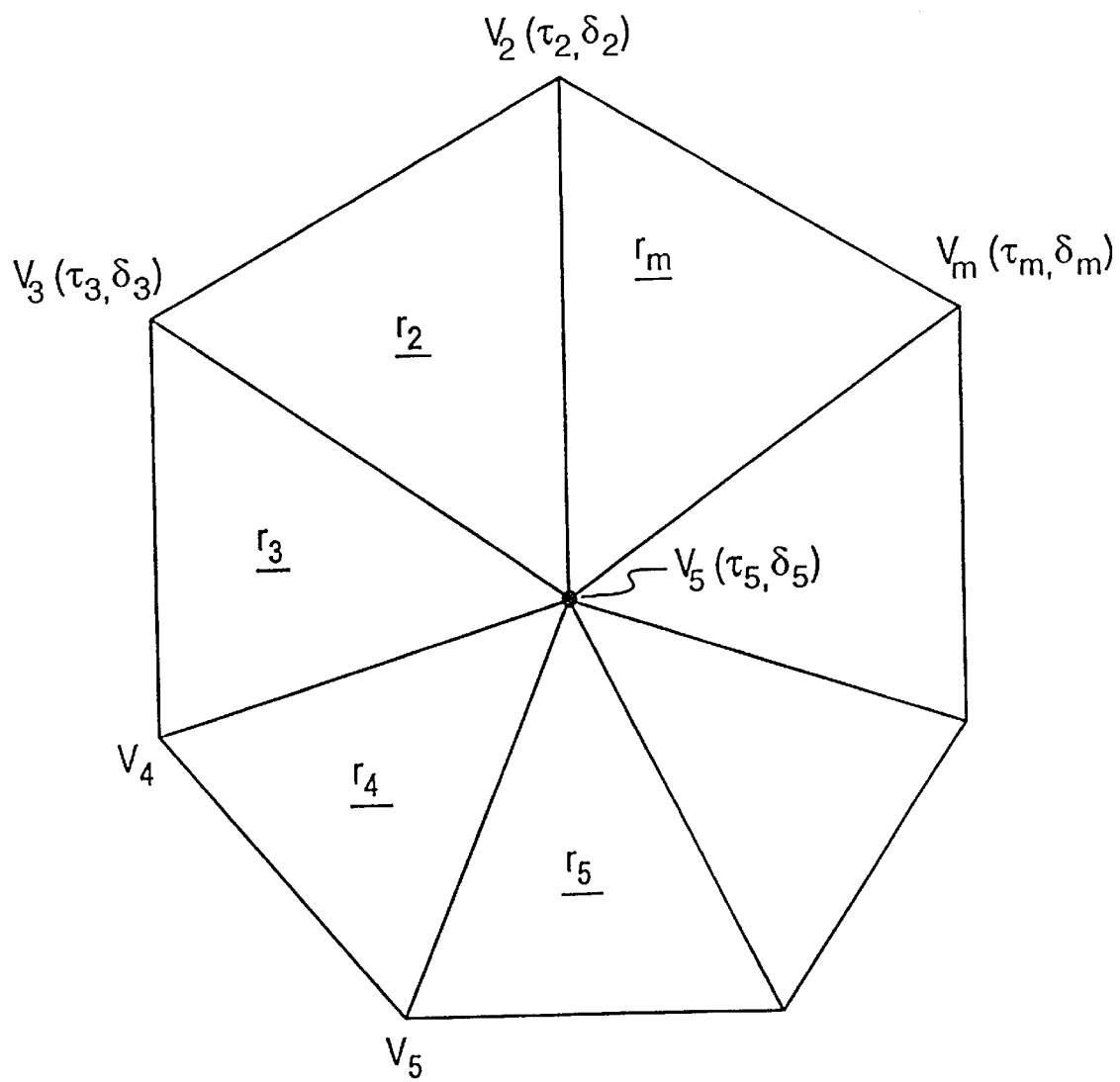
FIG. 14 is a pictorial representation of the star of a potential simplified vertex.

An example of such tetrahedra is shown in FIG. 14. Second, an equation for the volume of each of the tetrahedron $r_2, r_3, \ldots r_m$ is generated. Preferably, the equation of the volume of a given tetrahedron $r_i$, which is defined by the vertices (g,vi,vj,vk), is derived as (⅙) of the determinant of the matrix m described above. For example, the equation of the volume for the $r_5$ tetrahedron may be derived as (⅙) the determinant of the matrix m4:

$$m5 = \begin{bmatrix} x & v5x & v6x \\ y & v5y & v6y \\ z & v5z & v6z \end{bmatrix}$$

This would lead to the following equation:

$$(1/6)[(x(v5y\ v6z-v5z\ v6y)+y(v6x\ v5z-v6z\ v5x)+z(v5x\ v6y-v5y\ v6x)]$$

Similar formulas hold true for each of the tetrahedra $r_2, r_3, \ldots r_m$. Finally, the x, y and z components of the equations for each tetrahedron $r_2, r_3, \ldots r_m$ are added together to form an equation that represents a volume associated with the potential representative vertex. The equation is preferably in the form:

$$xe_1 + ye_2 + ze_3.$$

where $e_1$ represents all of the coefficients of x in the expression for all of the tetrahedra $r_2, r_3, \ldots r_m$, $e_2$ represents all of the coefficients of y in the expression for all of the tetrahedra $r_2, r_3, \ldots r_m$, and $e_3$ represents all of the coefficients of z in the expression for all of the tetrahedra $r_2, r_3, \ldots r_m$.

In step 1205, the equation generated in step 1203 is equated to the volume v calculated in step 1201, thus resulting in the following equation:

$$xe_1 + ye_2 + ze_3 = v$$

In step 1207, a plane $p_s$ that satisfies the equation generated in step 1205 is identified. Preferably, the plane $p_s$ is computed as follows. The left and right side of the equation generated in step 1205 is divided by $e_1^2 + e_2^2 + e_3^2$ to obtain the following equation, which defines the plane $p_s$:

$$xf_1 + yf_2 + zf_3 = v_1$$

where $f_1^2 + f_2^2 + f_3^2 = 1$

In step 1209, the equations of the planes $p_0, p_1 \ldots p_m$ are computed, wherein $p_i$ is the plane on which the corresponding triangle $T_i$ lies. Preferably, the equations of the planes $p_0, p_1 \ldots p_m$ are computed using the surface normal of the corresponding triangles. More specifically, the equation of a plane $p_i$ may be represented as follows:

$$p_i = a_i x + b_i y + c_i z - d_i.$$

The nx,ny, and nz components of the surface normal may be used as the $a_i$, $b_i$, $c_i$ coefficients of the plane equation. The $d_i$ coefficient may be obtained by computing the scalar product between the surface normal and each vertex of the corresponding triangle, and averaging such scalar products.

Finally, in step 1211, the coordinates x,y,and z of the potential simplified vertex vs are solved such that x,y,z of vs lie in the plane $p_s$ and the sum of the squared distances from vs to each of the planes $p_0, p_1 \ldots p_m$ is a minimum. This is preferably accomplished as follows. First, a symmetry transformation S is determined that exchanges $(f_1, f_2, f_3)$ of the plane equation generated in step 1207 with (0,0,1). The symmetry transformation S is preferably determined using a Householder transformation (See Golub and Van Loan, pp 195–197). Second, the transformation S is applied to the coordinates of each vertex v0,v1, . . . ,vm of the triangles of edge star as well as the equation of each plane $p_0, p_1 \ldots p_m$ generated in step 1209. Third, a linear system of equations is computed as follows:

$$\begin{bmatrix} a_0 & b_0 \\ a_1 & b_1 \\ a_2 & b_2 \\ \vdots & \vdots \\ a_m & b_m \end{bmatrix} \begin{bmatrix} x \\ y \end{bmatrix} = \begin{bmatrix} c_0 v_1 - d_0 \\ c_1 v_1 - d_1 \\ c_2 v_1 - d_2 \\ \vdots \\ c_m v_1 - d_m \end{bmatrix}$$

Fourth, the set of linear equations is solved for x and y using standard Normal Equations, for example, as described in Golub and Van Loan, "Matrix Computations", Johns Hopkins Press, 1989, pp. 224–225, incorporated herein by reference in its entirety. In addition, the value of z is set to $v_1$. Finally, the transformation S and the transformation −T is applied to the coordinates (x,y,z) to compute the coordinates (x,y,z) of the potential simplified vertex vs.

In an alternate embodiment of the present invention, tetrahedra $u_0, u_1, \ldots u_m$ may be identified in step 1203 as follows:

$u_o$=vs and the three vertices of t0
$u_l$=vs and the three vertices of t1
$u_m$=vs and the three vertices of tm In this case, the equation of step 1203 would be equated to zero in step 1205. This would lead to an alternate derivation of the same equation established in step 1207. Step 1201 may be omitted.

Moreover, in an alternate embodiment of the present invention, in step 1211, the coordinates x, y, and z of the potential simplified vertex vs are solved such that the coordinates x, y, z lie in the plane $p_s$ and the maximum distance from vs to each of the planes $p_0, p_1 \ldots p_m$ is a minimum.

Figure 15:
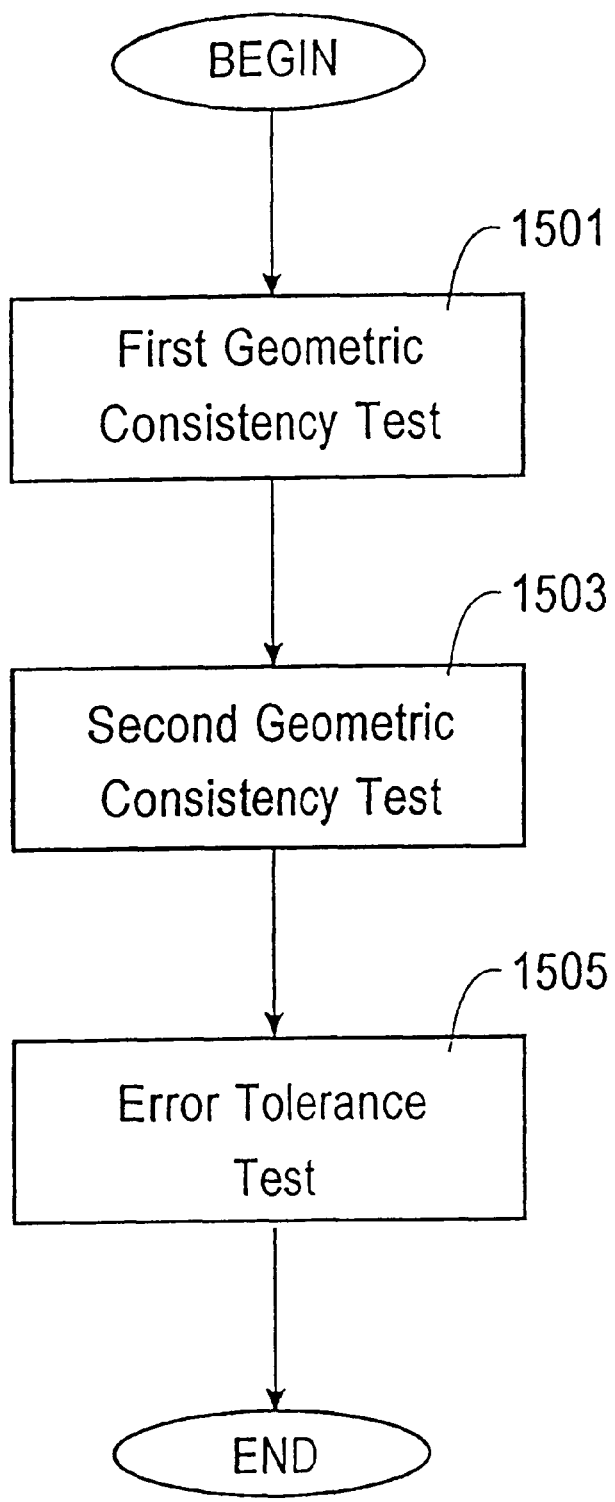
FIG. 15 is a flow chart illustrating the secondary collapsibility tests which are preferably used by the simplification technique of the present invention.

A more detailed description of the operation of the system in performing the secondary collapsibility tests of step 617 above is now set forth with respect to FIG. 15. The secondary collapsibility tests preferably include one or more geometric consistency tests and an error tolerance test. As shown in FIG. 15, the second collapsibility tests preferably begins operation in step 1501 with a first geometric consistency test performed on the normals of the triangles of the edge star of the selected edge. More specifically, for each triangle in the edge star, a scalar product of the surface normal of the triangle prior to simplification and the surface normal of the corresponding representative triangle (which is generated in step 615 above) is determined. If any of such scalar products associated with the triangles of the edge star is less than a predetermined maximum, the first geometric consistency test fails, the edge is marked as not collapsible and the operation ends; otherwise operation continues to step 1503. The predetermined minimum scalar product may be specified by the user, and preferably is greater than zero.

In step 1503, a second geometric consistency rest is preferably performed that ensures that none of the resultant triangles after simplification exceed a predetermined criterion reflecting narrowness of the resultant triangles. More specifically, for each triangle in the edge star, a first coefficient Cp that reflects the narrowness of the triangle is determined. And, for each triangle in the star of the potential simplified vertex, a second coefficient Cs that reflects the narrowness of the corresponding representative triangle is determined. Preferably, the coefficients Cp and Cs are determined as follows:

$$c = \frac{4\sqrt{3}\, a}{l_0^2 + l_1^2 + l_2^2}$$

where c is the coefficient Cp or Cs. a is the area of the triangle and $l_0, l_1, l_2$ are lengths of the three sides of the triangle.

The minimum Cp value is then identified and multiplied by a minimum ratio R. The result is then compared to the minimum Cs value. If the result is greater than the minimum Cs value, the second geometric consistency test fails; otherwise the second geometric consistency test passes. The minimum ratio R is preferably greater than zero and may be set by user input. If the second geometric consistency test fails, the edge is marked as not collapsible and the operation ends; otherwise operation continues to step 1505.

In step 1505, an error tolerance test is performed wherein it is determined whether the simplified vertex generates an error bound that exceeds a predetermined tolerance level. A more detailed description of the computation of such an error bound and the associated tolerance level is described below with respect to FIG. 16. If in step 1505 it is determined that simplified vertex generates an error bound that exceeds the predetermined tolerance level, the edge is marked as not collapsible and the operation ends. However, if in step 1505 the simplified vertex generates an error bound that does not exceed the predetermined tolerance level, the edge is marked as collapsible and the operation ends.

Figure 16:
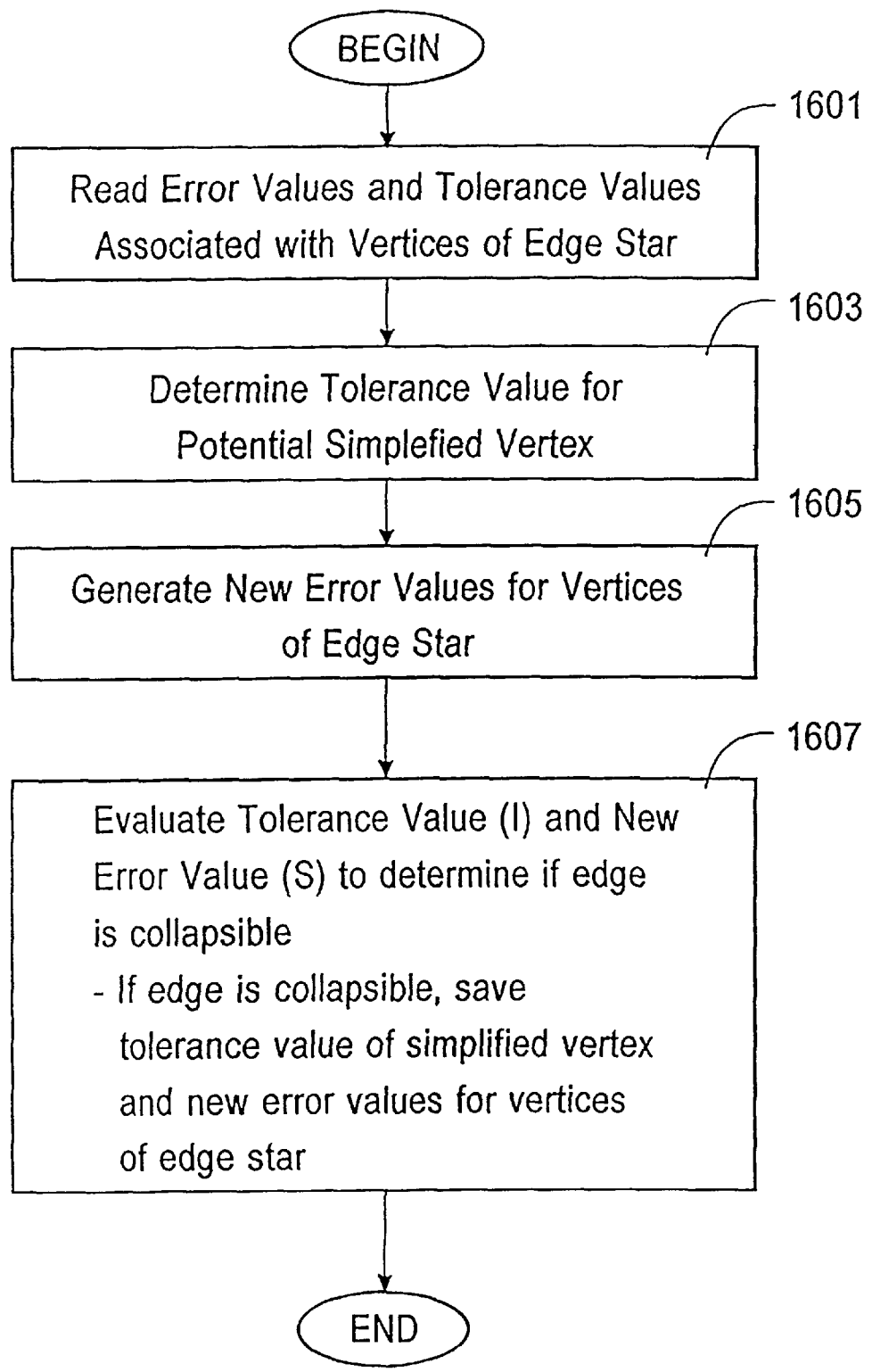
FIG. 16 is a flow chart illustrating operation of the error tolerance test of FIG. 15 according to the present invention.

FIG. 16 illustrates the operations of the system in computing the error bound and tolerance levels associated with a potential simplified vertex according to the present invention. More specifically, the operation begins in step 1601 by reading the error value and tolerance value from the copies of the entries of the list of vertices 300 that correspond to the vertices of the edge star of the selected edge. The error value associated with a vertex represents the upper bound estimate of an error that may arise as the result of the simplification operation. The tolerance value associated with a vertex represents the maximum error for that vertex. The tolerance values assigned to the entries of the list of vertices may be initialized manually by the user, or may be initialized automatically. In addition, the error values associated with the vertices may be initialized, for example, to a zero value. The vertices of the edge star of the selected edge may be denoted as v0,v1 . . . vm. In this case, the error values corresponding to the vertices of the edge star of the selected edge may be denoted as $\epsilon_0, \epsilon_1, \ldots \epsilon_m$, and the tolerance values corresponding to the vertices of the edge star of the selected edge may be denoted as $\tau_0, \tau_1, \ldots \tau_m$.

In step 1603, a tolerance value $\tau_s$ associated with the potential simplified vertex is determined. Preferably, the tolerance value $\tau_s$ is based upon the tolerance values of the vertices v0,v1 of the potentially collapsible edge. For example, the tolerance value $\tau_s$ may be determined as the minimum of the tolerance values $\tau_o$ and $\tau_l$.

In step 1605, new error values $\delta_2, \delta_3, \ldots \delta_m$ associated with the vertices of the edge star (excluding the vertices of the potentially collapsible edge v0,v1) of the selected edge and a new error value $\delta_s$ associated with the potential simplified vertex vs is computed. Three methods have been developed to compute such error values. A more detailed description of such methods is set for below.

Figure 17:
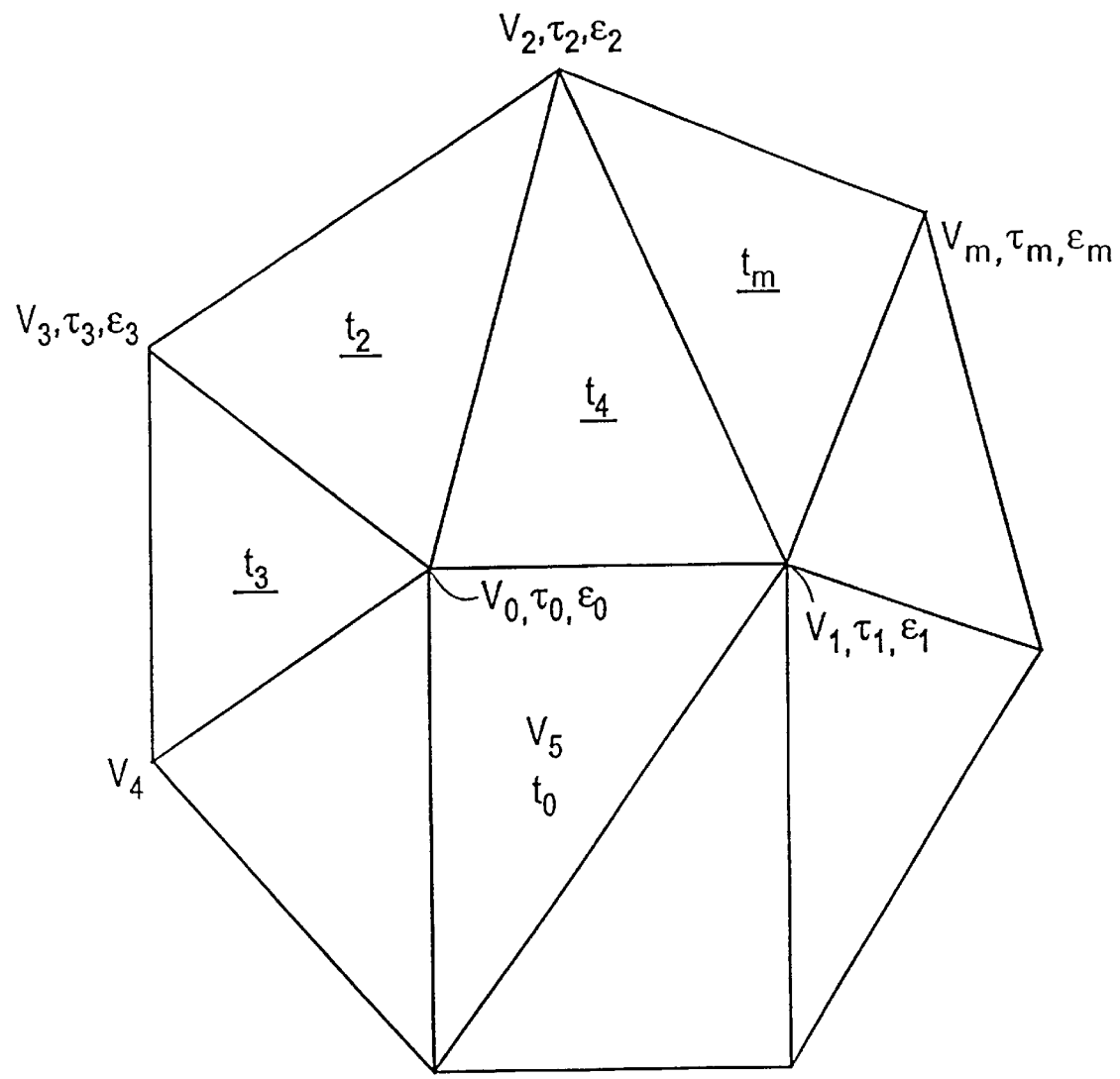
FIG. 17 is a pictorial representation of the edge star of FIG. 13(G) illustrating the assignment of error values and tolerance values to the vertices of the edge star prior to simplification.
Figure 18:
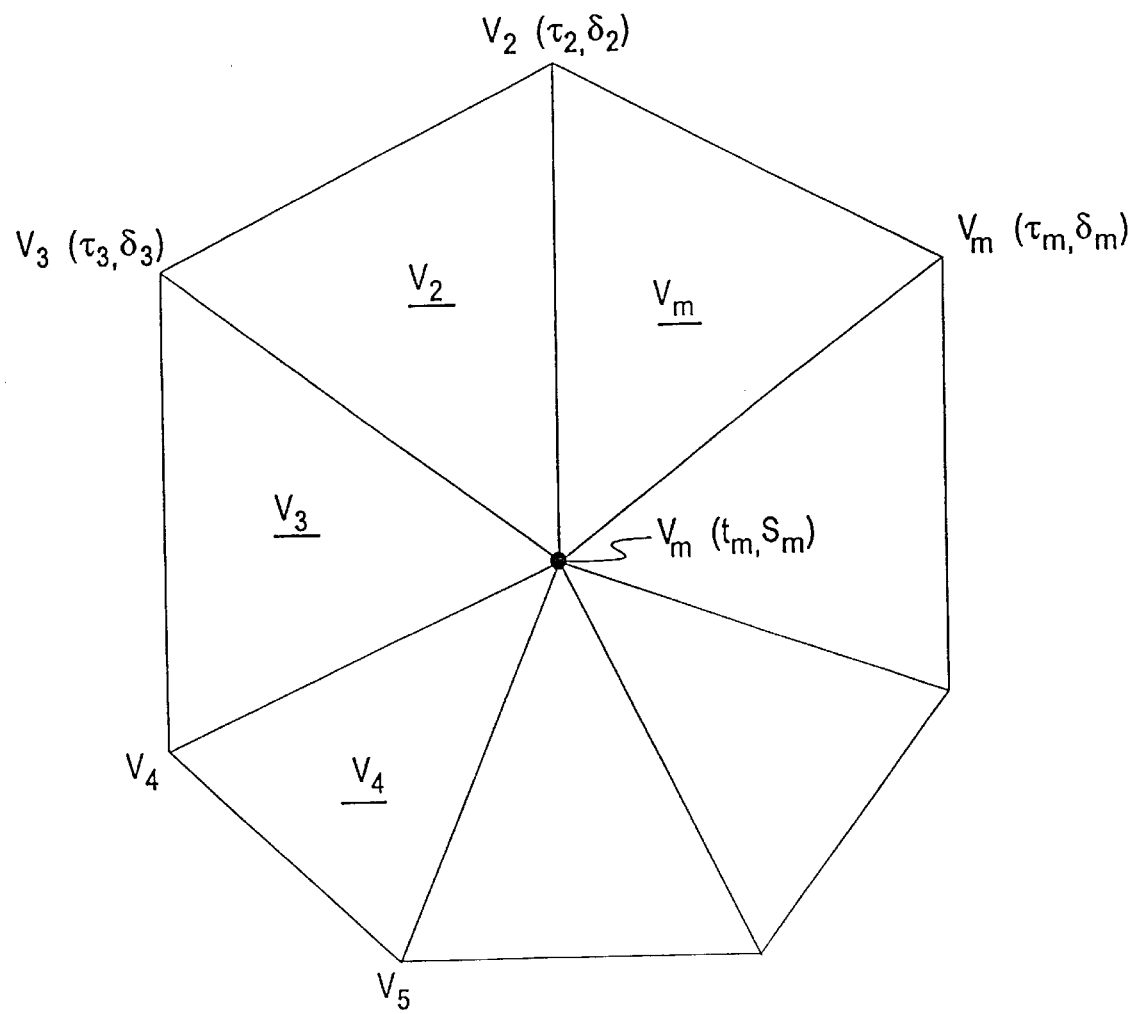
FIG. 18 is a pictorial representation of star of FIG. 14 illustrating the assignment of error values and tolerance values to the vertices of the star of the potential simplified vertex that results from simplification.

In step 1607, one or more of the tolerance values $\tau_s, \tau_2, \ldots \tau_m$ and one or more of the new error values $\delta_s, \delta_2 \ldots \delta_m$ are evaluated to determine if the edge is collapsible. Preferably, the edge is determined to be collapsible if the maximum of the new error values $\delta_s, \delta_2, \ldots \delta_m$ is less than the minimum of the tolerance values $\tau_s, \tau_2, \ldots \tau_m$. If the edge is determined not to be collapsible, the edge is marked as not collapsible and the operation ends. However, if the edge is determined to be collapsible, the edge is marked as collapsible and the tolerance value $\tau_s$ of the potential simplified vertex computed in step 1603 is saved in the copy of the entry of the list of vertices corresponding to the representative vertex for the potential simplified vertex. As described above, one of the vertices v0 of the selected edge is chosen as the representative vertex for the potential simplified vertex. In addition, the new error values $\delta_s, \delta_s \ldots \delta_m$ computed in step 1605 are saved in the corresponding copies of entries of the list of vertices. FIG. 17 illustrates the assignment of error values and tolerance values to the vertices of the edge star prior to simplification. FIG. 18 illustrates the assignment of error values and tolerance values to the vertices of the star of the potential simplified vertex that results from simplification.

In the first method, Method I, the new error values $\delta_2, \delta_3 \ldots \delta_m$ that are associated with the vertices of the edge star that are not part of the potential collapsible edge (i.e., excluding v0 and v1) are equated to the old error values $\epsilon_2, \epsilon_3, \ldots$ Thus $\delta_2 = \epsilon_2, \delta_3 = \epsilon_3 \ldots \delta_m = \epsilon_m$. In addition, the new error value $\equiv_s$ associated with the potential simplified vertex is given by the following formula:

$\delta_s$=maximum (distance(vs,v0)+$\epsilon_0$, distance(vs,v1)+$\epsilon_1$).

The second and third methods, Method II and III, determine new error values $\delta_s, \delta_2 \ldots \delta_m$ by first collecting a series of constraints, and by choosing new error values $\delta_s, \delta_2 \ldots \delta_m$ that satisfy these constraints. Generally, methods II and III generate the new error values $\delta_s, \delta_2 \ldots \delta_m$ as follows. First, an error volume is assigned to the vertices of triangles of the edge star. Each triangle $T_i$ of the edge star is partitioned into a plurality of planar polygons $T_{ik}$. For each planar polygon $T_{ik}$, an error volume is derived, which is preferably computed by linear interpolation of the error volumes assigned to the vertices of the triangle $T_i$. In addition, each of the planar polygons $T_{ik}$ is associated with one of the triangles, triangle $Q_k$, of the star of the potential simplified vertex. Finally, an error volume for each triangle $Q_k$ is derived that encloses the error volumes derived for the planar polygons $T_{ik}$ associated with the given triangle $Q_k$. Preferably, the error volume derived for a given triangle $Q_k$ is computed by collecting constraints that depend upon the error volumes of the associated planar polygons and the heights between such planar polygons and the given triangle $Q_k$. The error volumes are preferably composed of spheres whose centers are situated on the corresponding triangles/planar polygons and whose radii correspond to the associated error values; however, the present invention is not limited in this respect and may be utilized with any volumetric representation. An example of using the present invention with a spherical error volumes is now set forth.

Methods II and III preferably begin by looping through each triangle t0,t1, ..., tm of the triangles of the edge star of the selected edge. For each triangle $T_i$, the barycentric coordinates of the vertices vs, v2, v3, ..., vm with respect to the triangle $T_i$ are computed. A definition of such barycentric coordinates is set forth in Hoffmann, "Geometric and Solid Modeling", 1989, pp 51, herein incorporated by reference in their entirety. The barycentric coordinates of each vertex vs, v2, v3, ..., vm are denoted below as $\alpha_s, \alpha_2, \ldots \alpha_m$. Each $\alpha_j$ is a vector of three coordinates denoted below as $\alpha_{j0}, \alpha_{j1}, \alpha_{j2}$. In addition, the heights (positive or negative) of vs, v2, ... vm above the plane $p_i$ of the triangle $T_i$ are computed. The heights are denoted below as $h_s, h_2, \ldots h_m$. Recall that the normal of plane $p_i$ is denoted $n_i$ and is stored in the entry of the list of triangles 400 corresponding to the triangle $T_i$.

Figure 20:
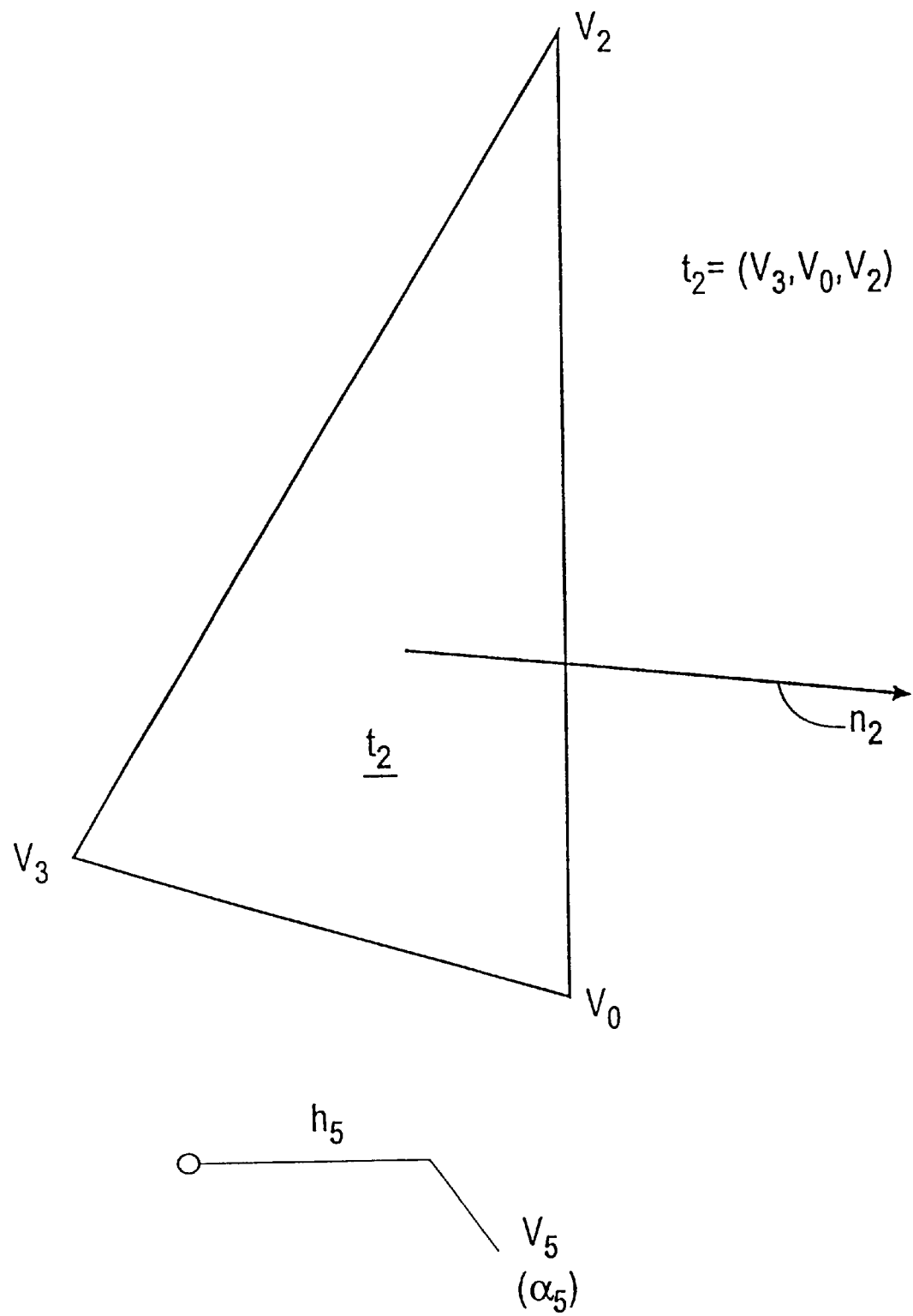
FIG. 20 is a pictorial representation of an exemplary case of the determination of barycentric coordinates of a point with respect to a given triangle.

The preferred method of determining the barycentric coordinates of a vertex $v_j$ with respect to a triangle $T_i$ and of determining the height $h_j$ of the vertex $v_j$ above the plane $p_i$ is now set forth. As an example, consider the case when i=2 and j=5. Thus the triangle $T_i$ corresponds to triangle $T_2$, $\alpha_j$ corresponds to $\alpha_5$, and $h_j$ corresponds to $h_5$. Other cases are treated similarly. As shown in FIG. 20, triangle $T_2$ is composed of the vertices (v3, v0, v2), and its normal is n2. The normal n2 is directly available from the entry in the list of triangles 400 corresponding to the triangle $T_2$. In this example, the vertex v5 may be represented as follows:

$$v5 = \alpha_{50} v3 + \alpha_{51} v0 + \alpha_{52} v2 + n2 h5 \quad (1)$$

wherein $\alpha_{50}$ is the barycentric coordinate referring to the first vertex of the triangle $T_2$, namely v3;

wherein $\alpha_{51}$ is the barycentric coordinate referring to the second vertex, v0;

wherein $\alpha_{52}$ is the barycentric coordinate referring to the third vertex, v2; and wherein v5, v3, v0 and n2 are vectors of three coordinates (x,y,z).

$\alpha_{50}$, $\alpha_{51}$, and $\alpha_{52}$ are preferably determined using the following procedure. It is assumed that (v3, v0) is the shortest edge of the triangle. If this is not true, (v3, v0, v2) are permuted circularly until the first two vertices form the shortest edge, and the corresponding backward permutation is stored. The vector v30 joining v3 to v0, the vector v32 joining v3 and v2, and the vector v35 joining v3 and v5 are computed. The following linear system of equations is solved using standard Normal Equations as described in Golub and Van Load, "Matrix Computations", Johns Hopkins Press, 1989, pp 224–225, incorporated by reference above:

$$\begin{bmatrix} v30_x & v32_x \\ v30_y & v32_y \\ v30_z & v32_z \end{bmatrix} \begin{bmatrix} \alpha_{51} \\ \alpha_{52} \end{bmatrix} = \begin{bmatrix} v35_x \\ v35_y \\ v35_z \end{bmatrix}$$

where the subscripts x, y and z naturally denote the x y and z coordinates of the vectors v30, v32 and v35.

$\alpha_{50}$, is set to $(1-\alpha_{51}-\alpha_{52})$. If need be, the stored backward permutation is applied to the result to give the barycentric coordinates $\alpha_{50}, \alpha_{51}$ and $\alpha_{52}$. Finally, the value of h5 is then determined by substituting the barycentric coordinates $\alpha_{50}$, $\alpha_{50}, \alpha_{51}$ and $\alpha_{52}$ in equation (1) with the values determined above and solving for h5.

The barycentric coordinates of the vertices vs, v2, v3, ..., vm with respect to the triangle $T_i$ identify the positions of the projections of the vertices vs, v2, v3, ..., vm on the plane $p_i$ on which the triangle $T_i$ lies. An operation is preferably performed that verifies that none of the edges the link of the potential simplified vertex have projected positions that intersect $T_i$. A more detailed description of the determination of whether there is an intersection of the projected position of an edge $v_i v_j$ and the triangle $T_i$ is set forth below with reference to the derivation of type A constraints.

Then, for each triangle $T_i$, one or more constraints are collected. There are preferably four classifications of constraints: Type A, Type B, Type C and Type D. For a given triangle $T_i$, there can be none or several type A constraints collected, there may be either one or two type B constraints collected, there may be either zero or one Type C constraint collected, and there may be either zero or one Type D constraint collected. A detailed description of the constraint collection operation is set forth below.

Method II consists of keeping the collected constraints (either A, B, C and D) in a list, and by calling a linear programming solver that minimizes the new error values $\delta_s, \delta_2 \ldots \delta_m$ subject to the list of constraints. The IBM Optimization Subroutine Library (OSL), which is commercially available for a broad range of operating systems/programming environments, may be used as the linear programming solver.

Method III consists of equating the new error values $\delta_2$, $\delta_3 \ldots \delta_m$ with the old error values $\epsilon_2, \epsilon_3, \ldots \epsilon_m$. Thus, $\delta_2=\epsilon_2$, $\delta_3=\epsilon_3 \ldots \delta_m=\epsilon_m$. $\delta_s$ is computed as follows. Initially, the value 0 is assigned to $\delta_s$. Subsequently, each time a constraint of type A, B C or D is encountered, a new potential value of $\delta_s$ is determined. The value of $\delta_s$ is modified and set to the new potential value only if this new potential value is greater than the current value of $\delta_s$.

Type A Constraint

Figure 19:
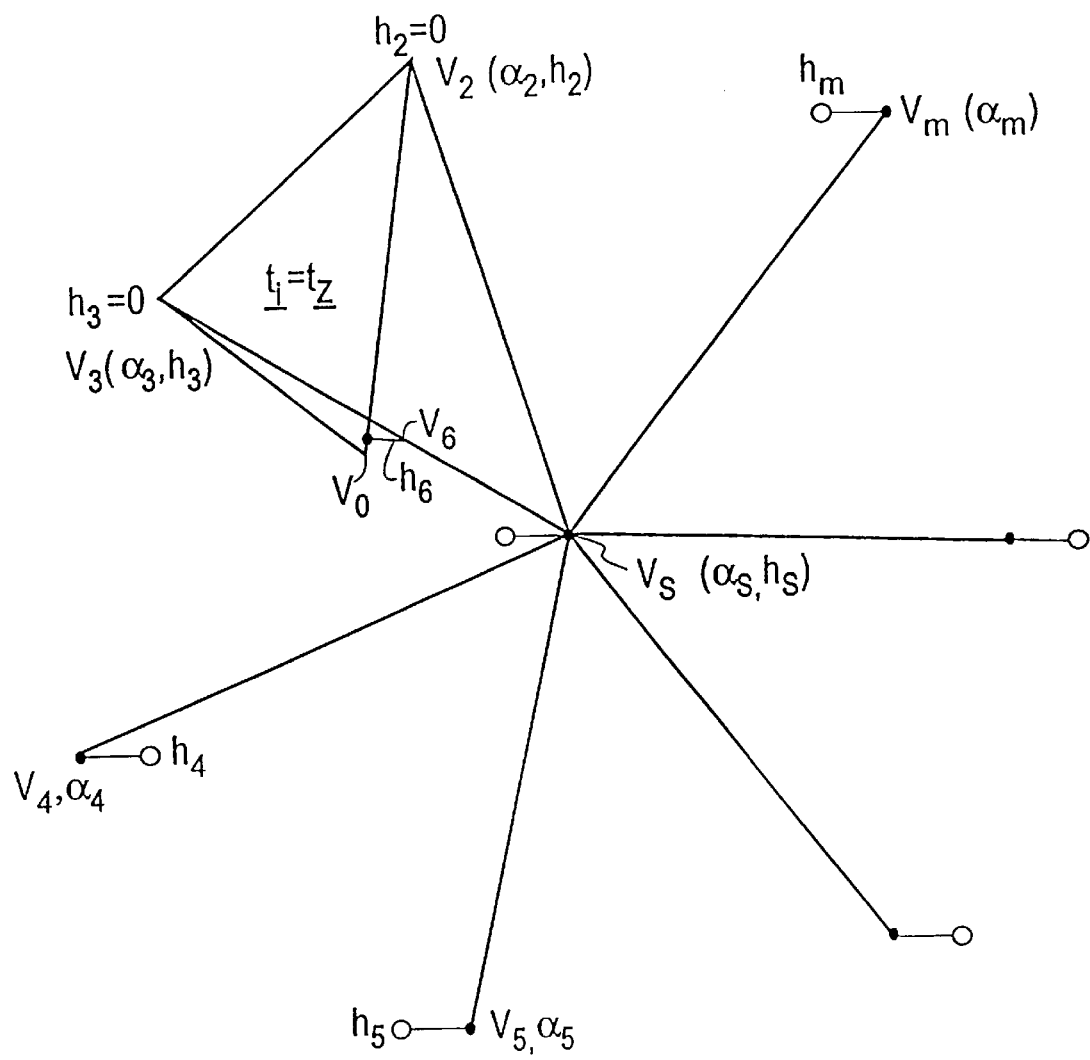
FIG. 19 is a pictorial representation of an exemplary case of the determination of a crossing that occurs in a Type A constraint.

A loop is performed on each edge defined by the vertex pairs of the star of the potential simplified vertex. The edges would include the following: (vs, v2), (vs, v3), (vs, v4), ..., (vs, vm). For each edge, it is determined if there is a change of sign of any barycentric coordinate between the two vertices of the edge. If there is a change in the sign, the point vc wherein the barycentric coordinate is zero is determined. This point is called a "crossing", because at this point the projection of the edge intersects the triangle $T_i$ from which the barycentric coordinates were computed. For explanatory purposes, consider the case illustrated in FIG. 19 where i=2 and j=3. Thus, the triangle $T_i$ corresponds to triangle $T_2$, and $\alpha_j$ corresponds to $\alpha_3$. Furthermore, suppose the first barycentric coordinate changes sign between vs and v3. Since v3 is a vertex of the triangle $T_2$, the vector of barycentric coordinates $\alpha_3$ is (1,0,0), where $\alpha_{30}$ is 1 and $\alpha_{s0}>0$. It is known that $\alpha_{s0}$ is negative because it is assumed that the first barycentric coordinate changes sign with $\alpha_{s0}*\alpha_{30}<0$. Next, a value t is defined as follows:

$$\lambda = -\frac{\alpha_{30}}{\alpha_{s0} - \alpha_{30}}$$

Next, the barycentric coordinates of vc, denoted $\alpha_c$, are computed as follows:

$$\alpha_{c0}=\lambda*\alpha_{s0}+(1-\lambda)*\alpha_{j0}$$

$$\alpha_{c1}=\lambda*\alpha_{s1}+(1-\lambda)*\alpha_{j1}$$

$$\alpha_{c2}=\lambda*\alpha_{s2}+(1-\lambda)*\alpha_{j2}$$

The next step is to determine if the three barycentric coordinates of vc ($\alpha_{c0},\alpha_{c1},\alpha_{c2}$) are greater than or equal to zero, which means that vc projects on the boundary of the triangle $T_2$ (it can't project inside since one barycentric coordinate is equal to zero by assumption). If this condition is satisfied, vc is indeed a crossing, and the coordinates of vc are determined as follows:

$$vc_0=\lambda*vs_0+(1-\lambda)*v3_0$$

$$vc_1=\lambda*vs_1+(1-\lambda)*v3_1$$

$$vc_2=\lambda*vs_2+(1-\lambda)*v3_2$$

Then, the height hc of vc above the plane $p_2$ is computed as follows:

$$hc=\lambda*hs+(1-\lambda)h3$$

The error $\epsilon_c$ at vc is then defined as:

$$\epsilon_c=\alpha_{c0}*\epsilon_3+\alpha_{c1}*\epsilon_0+\alpha_{c2}*\epsilon_2$$

Note that in this equation, at least one of $\alpha_{c0}$, $\alpha_{c1}$, $\alpha_{c2}$ is zero, namely the first coordinate $\alpha_{c0}$. Then, a constraint on the new delta values is determined as follows:

$$\delta_s*\lambda+\delta_j*(1-\lambda)\geq|hc|+\epsilon_c$$

where |hc| denotes the absolute value of hc.

Method II consists of adding this constraint to a list of constraints initially empty.

Method III consists of initializing the value of $\delta_s$ to zero and updating the value of $\delta_s$ only if the new potential value of $\delta_s$ exceeds the current value of $\delta_s$. The new potential value of $\delta_s$ is determined as follows:

$$\delta_s = \frac{(|hc|+\epsilon_c+(\lambda-1)\delta_j)}{\lambda}$$

$\delta_j$ may be replaced with $\epsilon_j$ in the expression, and the expression becomes:

$$\delta_s = \frac{(|hc|+\epsilon_c+(\lambda-1)\epsilon_j)}{\lambda}$$

Preferably, it is determined whether all edges for which a crossing was identified as described above can be circularly ordered without gaps. If this condition is satisfied, then the process continues; otherwise, the edge is marked as not collapsible and the process terminates. For example, the following list of edges can be circularly ordered without gaps: (vs,v3), (vs,v4), (vs,v5); however, the following list cannot be circularly ordered without gaps: (vs,v3), (vs,v4), (vs,v6).

Type B Constraint

The type B constraint is applied to both vertices v0 and v1. It is determined whether v0 or v1 or both v0 and v1 belong to the triangle $T_i$. For explanatory purposes, consider the example discussed above with respect to FIG. 21 where v0 belongs to $T_2$. In a first step, the projections of the triangles (vs,v2, v3), (vs,v3,v4) . . . onto the triangle $T_2$ which contain the vertex v0 are identified. Such projections are denoted q2, q3, . . . qm below. It is possible that v0 projects exactly onto one of the edges (vs, v2), . . . , (vs, v3). If this is the case, vc is a crossing. However, it is preferably treated as Type B constraint.

The second step is to loop through the projections serially and locate the first projection qk onto which v0 projects. Preferably, one of the edges of the first projection qk is an edge where a "crossing" is identified as described above. If there is no projection onto which v0 projects, then the configuration is "invalid" and the selected edge is marked as not collapsible. However, if there is at least one projection onto which v0 lies, a third step is performed.

Figure 21:
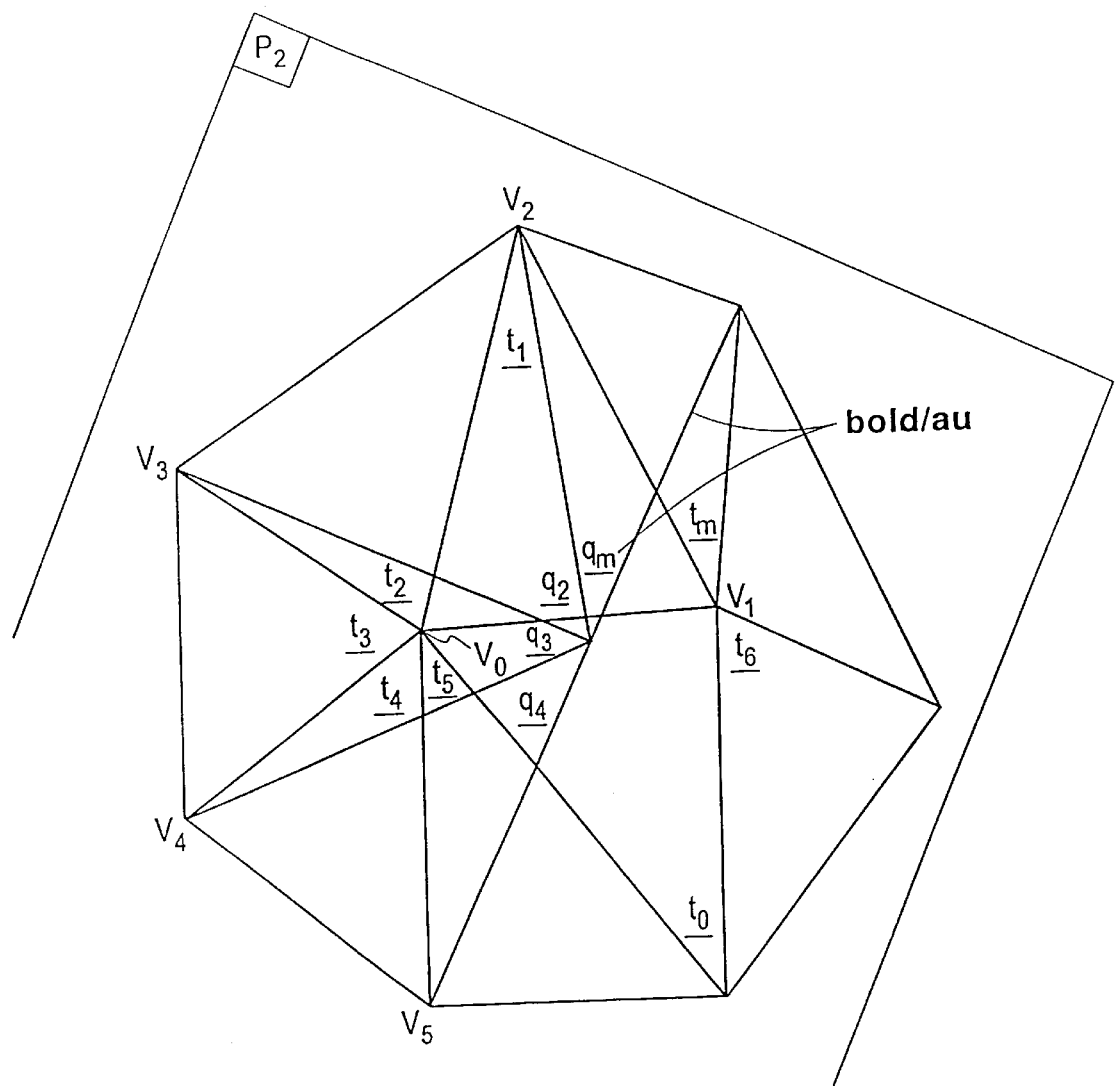
FIG. 21 is a pictorial representation of the edge star and associated parameters used in the determination of Type B constraints.

For illustrative purposes, consider FIG. 21 where v0 lies inside the projection of q3=(vs,v3,v4). The third step is to compute the closest point from v0 to the triangle (vs, v3, v4) as well as the vector of barycentric coordinates, denoted $\beta$, with respect to (vs, v3, v4). Preferably, the vector $\beta$ is generated using the method described above to generate the vectors $\alpha_i$. In addition, the distance d0 from v0 to the plane of (vs, v3, v4) is determined.

Finally, a fourth step is performed whereby a constraint is identified as follows:

$$\delta_s*\beta_0+\delta_3*\beta_1+\delta_4*\beta_2 \geq d0+\epsilon_0$$

where $\beta_0$, $\beta_1$, $\beta_2$ are the components of the vector $\beta$.

If need be, the constraint may be expressed as follows:

$$\delta_s \geq \frac{-\delta_3*\beta_1-\delta_4*\beta_2+d0+\epsilon_0}{\beta_0}$$

Figure 23:
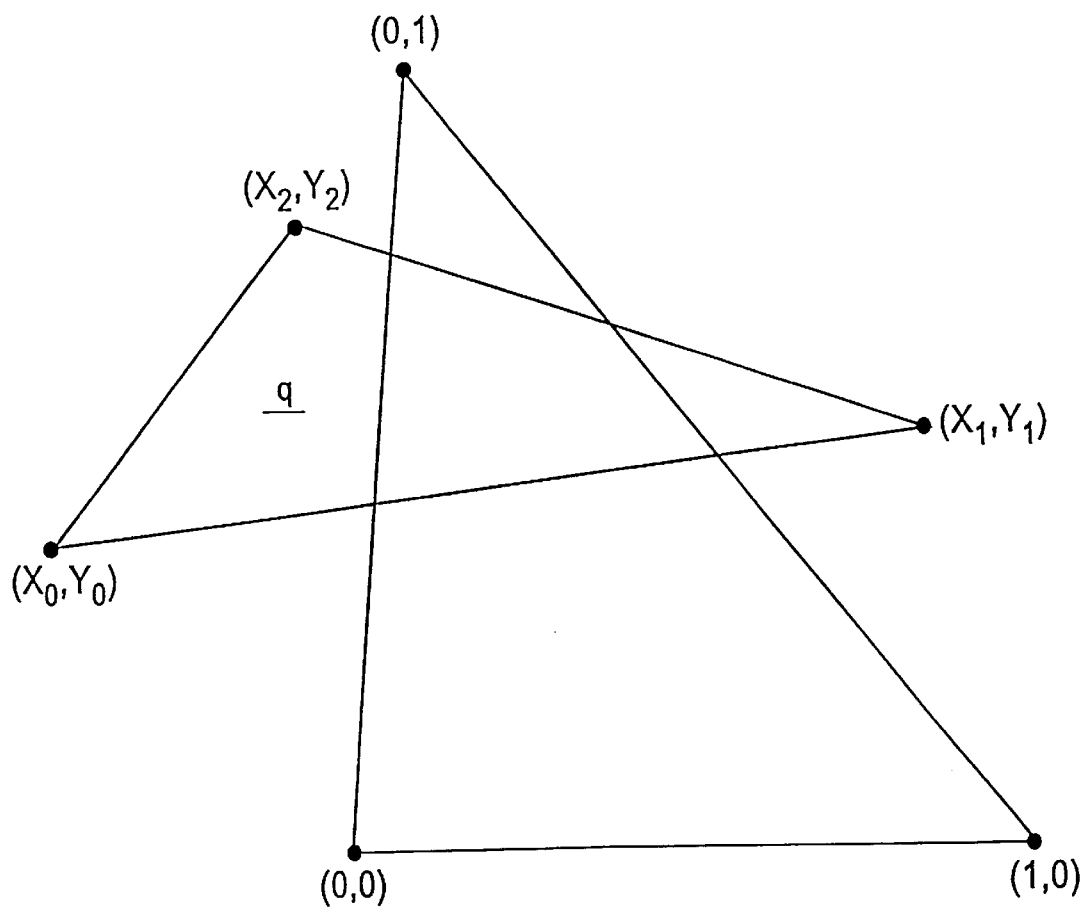
FIG. 23 is a pictorial representation of an exemplary case of the determination of whether a given vertex is located within a given triangle.

The following operations may be used to determine if v0 projects onto a projection qk (i.e., projection qk contains v0). First, the last two barycentric coordinates of v0 are determined. The last two barycentric coordinates may be either (0,0), (1,0) or (0,1) since v0 is one of the vertices of the triangle $T_2$, Then, the barycentric coordinates of the three vertices of the projection qk under test, denoted below as (x0,y0), (x1,y1) and (x2, y2) is determined. An example of the vertices (x0,y0), (x1,y1) and (x2,y2) is shown in FIG. 23. For a given point with coordinates (x,y), the given point is inside the projection qk if the area of the following three triangles is greater than or equal to zero. The three triangles include:

1) the triangle (x0,y0), (x1,y1), (x,y)
2) the triangle (x1,y1), (x2,y2), (x,y)
3) the triangle (x2,y2), (x0,y0), (x,y)

The area of the triangle (x0,y0), (x1,y1), (x,y) may be represented by the (½) the determinant of the following matrix (See O'Rourke "Computational Geometry in C" Cambridge University Press, 1994 pp.30–31):

$$\begin{bmatrix} x_0 & x_1 & x \\ y_0 & y_1 & y \\ 1 & 1 & 1 \end{bmatrix}$$

Similar steps may be performed for the other two triangles. This leads to the following three equations:

$$x(y0-y1)+y(x1-x0)+x0y1-y0x1 \geq 0$$

$$x(y1-y2)+y(x2-x1)+x1y2-y1x2 \geq 0$$

$$x(y2-y0)+y(x0-x2)+x2y0-y2x0 \geq 0$$

If the three values obtained by replacing x and y with the actual barycentric coordinates of v0 (which are either (0,0), (1,0) or (0,1)) are positive, then it is determined that v0 is inside the projection qk. Otherwise, it is determined that v0 is outside the projection qk.

Type C Constraint

Figure 22:
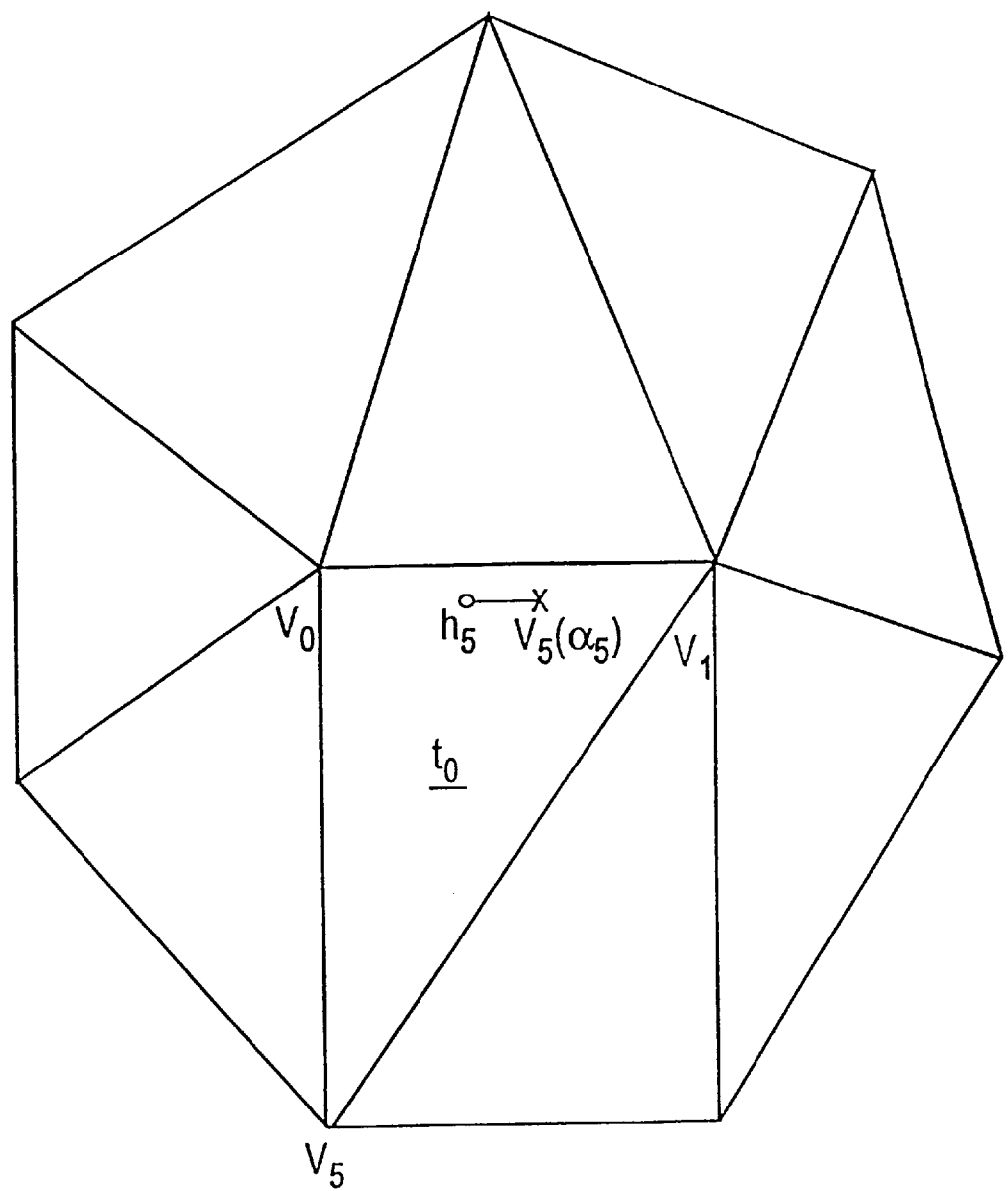
FIG. 22 is a pictorial representation of the edge star and associated parameters used in the determination of Type C constraints.

The type C constraint verifies whether the potential simplified vertex vs projects inside the triangle $T_i$. This constraint is holds true if all three barycentric coordinates of the potential simplified vertex vs with respect to the vertices of $T_i$ are greater than or equal to zero. Preferably, the barycentric coordinates ($\alpha_{s0}, \alpha_{s1}, \alpha_{s2}$) of the vertices of the triangle $T_i$ are generated using the method described above to generate the vectors $\alpha_i$. For example, consider the triangle T4 whose vertices comprise (v1,v0,v5) as shown in FIG. 22. In this case, if this test is true, then the constraint is generated as follows:

$$\delta_s \geq |h_s| + \alpha_{s0}*\epsilon_1 + \alpha_{s1}\epsilon_0 + \alpha_{s2}*\epsilon_5$$

where $h_s$ is the height of potential simplified vertex vs above the plane of p4.

Type D Constraint

The type D constraint is activated after all triangles have been processed, exclusively in the case when no type C constraint was generated. In that case, an edge, denoted f, is selected from all edges belonging to the triangles of the edge star less the edges of the link of the edge star. The edge f is the closest edge to the potential simplified vertex vs. For the edge f, the potential simplified vertex vs is projected onto f, and the distance df between vs and its projection onto f, denoted vf, is computed. The barycentric coordinates of vf, denoted $\alpha_k$ and $\alpha_l$, with respect to the vertices of f (denoted vk and vl) are computed. The vertices vk and vl are associated with error values $\epsilon_k$ and $\epsilon_l$. A constraint is then generated as follows:

$$\delta_s \geq df + \alpha_l*\epsilon_l + \alpha_k*\epsilon_k$$

In an alternate embodiment of the present invention, the following methods can be used to collect constraints on the new error values, $\delta_i$. The processing of such constraints follows either Method II or Method III as set forth above.

The difference between Method IV and Method V is that Method IV processes constraints according to Method II and Method V processes constraints according to Method V.

Figures 24A, 24B:
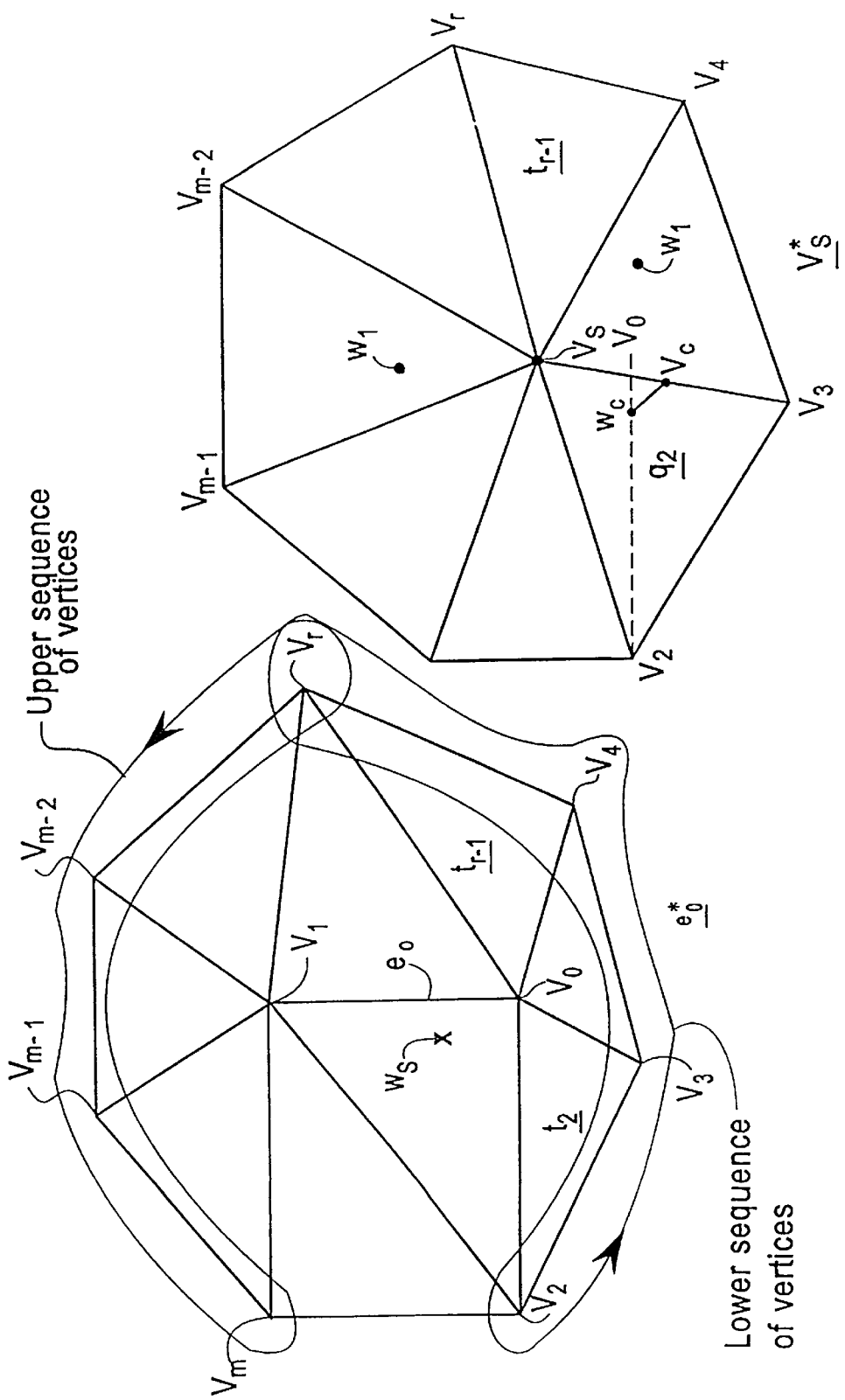
FIGS. 24(A)–(B) are pictorial representations of the edge star and simplified vertex star, respectively, illustrating notations used in Methods IV and V of the present invention.

As before, a mapping is defined between the triangles of the edge configuration before simplification, represented by the edge star (denoted below as e0*), and the triangles of the configuration after simplification, represented by the star of the simplified vertex (denoted below as vs*), as illustrated in the FIG. 24. However, this mapping is not obtained by looping on each triangle and projecting the configuration separately on each triangle as accomplished in Methods II and III.

More specifically, Methods IV and V construct a tiling of the star e0* that is in one to one mapping with a tiling of the star vs*. The mapping is one to one because the two tilings have corresponding vertices and corresponding edges. The following description indicates how corresponding vertices are identified, which is sufficient for implementing this method. In the beginning of the process, the initial tiling of e0* contains the vertices of e0* and the edges of e0*. The same applies to the initial tiling of vs*. The tiling begins by assigning three arbitrary vertex-triangle correspondences. The tiling is then completed by determining corresponding "edge crossing points" when computing the shortest distance between edges. Edge crossing points are precisely defined below.

First, determine the closest point to the vertex vs on the triangles t0 and t1. The position of this point is obtained by projecting vs on both t0 and t1 as set forth above and by retaining the projected vertex that is the closest to vs. This point is denoted ws. The couple of points (vs, ws) is associated with the distance hs from vs to ws as well as the barycentric coordinates of ws with respect to the vertices of the triangle of which ws lies. These barycentric coordinates are denoted alpha__0, alpha__1 and alpha__2. For instance, in the case of FIG. 24, ws can be expressed as follows:

$$ws = \text{alpha}\_0 \; v0 + \text{alpha}\_1 \; v1 + \text{alpha}\_2 v2,$$

whereby ws, v0, v1 and v2 denote the vectors representing the 3D coordinates of each vertex.

The constraint associated with (vs,ws) is derived as follows:

$$\text{delta}\_s = hs + \text{alpha}\_x20 \; \text{epsilon}\_0 + \text{alpha}\_1 \; \text{epsilon}\_1 + \text{alpha}\_2 \; \text{epsilone}\_2.$$

The vertex ws as well as the three edges (ws,v0) (ws,v1) and (ws,v2) are added to the tiling of e0*.

Then determine the closest point to the vertex v0 on the triangles q2 . . . qr-1. The position of this point is obtained by projecting v0 on each triangle of the sequence q2 . . . qr-1 and by retaining the projected vertex that is closest to vs. This is denoted point w0. The couple of points (v0,w0) is associated with epsilon0, the distance h0 between v0 and w0 and the barycentric coordinates denoted alpha of w0 with respect to the vertices of the triangle on which w0 lies. For instance, in the FIG. 24, these are vertices vs, v3 and v4. The constraint associated with (v0,w0) is derived as:

$$hc = \text{distance } (vc, wc),$$

$$vc = \text{lambda}\_c \; vs + (1 - \text{lambda}\_c) \; v3,$$

$$wc = \text{mu}\_c \; v2 + (1 - \text{mu}\_c) \; v0,$$

and by then deriving the following constraint equation:

lambda_c delta_s+(1-lambda_c) delta_3=hc+mu_c epsilon_2+
(1-mu_c) epsilon_0

For each such edge crossing point identified, the edge (v2, v0) is removed from the tiling of e0*, and the vertex wc is added. In addition, the four edges (v2,wc) and (wc,v0), (ws,wc) and (wc,v3) are added. Also, the edge (vs,v3) is removed from the tiling of vs*, and the vertex vc and the four edges (vs,vc) and (vc,v3), (v2, vc) and (vc,w0) are added.

This sequence of operations is repeated for each edge linking vs and the upper sequence of vertices by visiting in turn each edge belonging to e0* that is adjacent to v1.

In an alternate embodiment of the present invention, one or more data values are associated with each vertex of the original surface. For example, he data values associated with a given vertex may represent the color of that vertex or a texture coordinate, such as a (u,v) coordinate for that vertex. According to the present invention, such data values are linearly interpolated between vertices, and the difference between the data associated with the original surface and the data associated with the simplified surface will be bounded by a maximum value gamma. The value gamma may be specified by the user. The data values are assumed to be real numbers; however, the present invention may be used with complex numbers or vectors provided that each coordinate is treated as a separated data.

First, the data values c0, c1, . . . cm are associated with the vertices of an edge star. For instance, v0,vl, . . . vm are associated with the data values c0,cl, . . . ,cm before simplification. There is a data error volume associated with the data. At each vertex a positive data error value phi_i is specified. It indicates that the true data value at that vertex is somewhere between ci-phi_i and ci+phi_i.

New data values are determined at the vertices after simplification: vs, v2, . . . , vm, denoted d_s, d_2 . . . vm, as well as new data error values denoted psi_s, psi_2, . . . , psi_m.

The principle underlying the method is very similar with what was set forth above. Constraints are collected on the d_i values and the maximum difference between linearly interpolated d data values and linearly interpolated c data values is minimized. Similarly to Method III above, the data values as well as the data error values at the link of the edge star under test are copied:

$$d\_2=c\_2, d\_3=c3, \ldots, d\_m=c\_ml$$

$$psi\_2=phi\_2, psi\_3=phi\_3, \ldots, psi\_m=phi\_m.$$

The new potential data value d_s and the new potential data error value are then determined as follows. The constraints used may be type A, type B, type C, or type D constraints as described above, or similar constraints. The type A, type B, type C, or type D constraints would be rewritten using the following three rules.

1) Each h_i value that appears in any of the A,B,C,D, constraint is replaced with 0;
2) Each epsilon_j value is replaced with c_j+phi_j;
3) Each delta_k value is replaced with d_k+psi_k.

The sum (d_k+psi_k) is isolated from the constraints as was done above for Method III. Each such obtained constraint is numbered using a counter n, and for each n, we determine lamda_n and w_n such that the constraint n can be rewritten as the following equation.

$$lambda\_n(d\_s+psi\_s)=w\_n$$

The following expression is minimized: MAX|lambda_n*x-w_n|. This produces a value x, which is assigned to d_s. The maximum is reached for a given n, denoted n_min.

The following expression is then evaluated to give psi_s:

$$psi\_s=|lambda\_n\_min*d\_s-w\_n|/lambda\_n\_min$$

If $psi_s$ is larger than gamma, the edge is marked as not collapsible; otherwise the edge is marked as collapsible.

Figure 11:
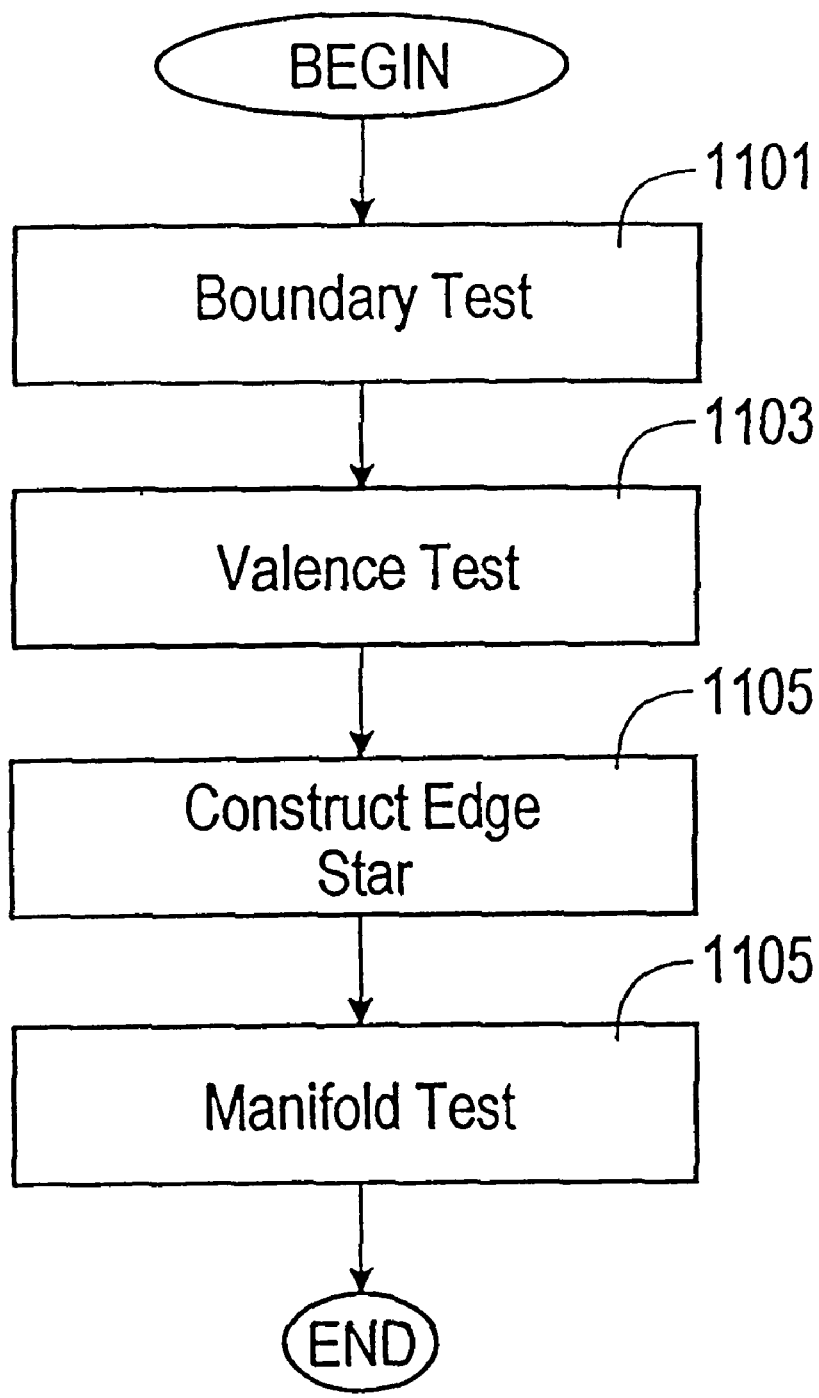
FIG. 11 is a flow chart describing the preliminary collapsibility tests which are preferably used by the simplification technique of the present invention.

In an alternate embodiment of the present invention, the boundary test of step 1101 of FIG. 11 may be modified such that boundary edges can be simplified. Preferably, such simplification preserves the length of the surface boundary after simplification. A boundary edge is such that both vertices of the edge are boundary vertices. Boundary vertices were defined precisely above.

Figure 25:
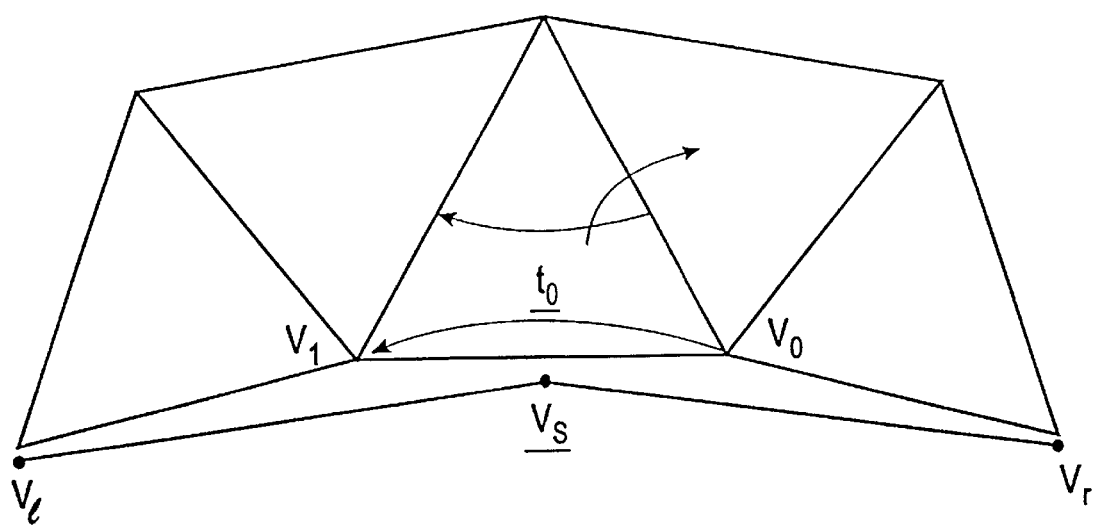
FIG. 25 illustrates the processing of a boundary edge according to an alternate embodiment of the present invention.

FIG. 25 shows e0=(v0,v1) which is a boundary edge under test. vr is the vertex located to the right of v0 on the boundary. v1 is the vertex located to the left of v1 on the boundary.

First, a valence test similarly to step 1103 is performed. The valence test for this particular case is:

$$2>=v(v0)+v(v1)-2>=valence\_max$$

Then, an ellipsoid is determined whose focal points are vr and vl such that any point m on the ellipse will satisfy the property relating the following distances:

$$dist(vr,m)+dist(v1,m)=dist(vr,v0)+dist(v0,v1)+dist(v1,v1)=2a$$

Such ellipsoid can be obtained using standard methods. On such ellipsoid, it is determined the location of the point that minimizes the sum of distances to the three lines determined by (vr,v0), (v0,v1) and (v1,vl), or that minimizes the sum of distances to a set of points or lines that are in the vicinity of vr,v0,v1 and vl. This point is denoted vm.

The topological consistency and geometric consistency tests of steps 1107 and 1503 are then performed. The error tolerance test of step 1607 as set forth in Method IV or V above is then performed, ignoring all steps referring to the lower sequence of vertices and the lower sequence of triangles.

If all the previous tests are passed successfully, the boundary edge is marked collapsible and the edge collapse operation is performed using the representative updates as indicated by arrows in the FIG. 25. If any of the tests fails, the boundary edge is marked as not collapsible and the process ends.

In summary, the simplification technique of the present invention provides three key advantages.

First, the approximation of the original surface preserves a solid volume. More specifically, if the original surface has a boundary, then the volume enclosed by a composite closed surface is preserved. The composite closed surface is preferably generated by juxtaposing to a first surface an arbitrary surface that shares the same boundary. This provides advantages by limiting the shrinkage of the original surface. Shrinkage degrades the visual appearance of the surface for graphical applications, and may degrade the accuracy of the surface such that the model becomes useless, for example, in medical imaging applications.

Second, the simplification technique of the present invention ensures that, at each point of the original surface, a first distance to the closest point on the simplified surface will be less than the tolerance specified for that point. Moreover, at each point of the simplified surface, a second distance to the closest point on the original surface will be less than the minimum of the tolerances at any of the surrounding vertices. This implies that the second distance will be less than the maximum tolerance that was specified for any point on the surface. An upper bound to the second distance at each point of the simplified surface is preferably represented by a positive error value at that point. Such error values are preferably derived from the width of an error volume associated with the simplified surface. Such error volume is preferably obtained by sweeping a sphere of linearly varying radius over the simplified surface. The technique presented is advantageous because such error values are point specific and may be re-used for distance and intersection computations, and also because such error volumes may be re-used for subsequent simplifications.

Third, the simplification technique of the present invention favors the creation of near equilateral triangles over narrow triangles. This is advantageous because near equilateral triangles produce better visual results when rendering and allow more accurate numerical computations for finite element applications or other numerical techniques.

The overall computational complexity of the method is subquadratic in the number of edges of the surface, making it affordable for large surface models. Processing of models containing as many as 500 K triangles or more takes a few minutes on a UNIX workstation.

I claim:

1. In a computer system wherein objects are represented by triangles defined by coordinates of vertices, a method for generating coordinates of a simplified vertex based upon coordinates of said vertices, the method comprising the steps of:
   identifying a first vertex and a second vertex that define an edge of said triangles;
   identifying a first set of triangles that are adjacent to said edge, wherein a first set of error values are associated with vertices corresponding to said first set of triangles;
   generating potential coordinates of said simplified vertex based upon coordinates of said first vertex and second vertex;
   identifying a second set of triangles that share said simplified vertex, and generating a second set of error values (based upon said first set of error values and said potential coordinates of said simplified vertex) associated with vertices corresponding to said second set of triangles:
   upon determining that said second set of error values satisfies a predetermined criterion, assigning coordinates of said simplified vertex to said potential coordinates; and
   storing coordinates of said simplified vertex in memory for subsequent rendering by the computer system;
   wherein the step of generating said second set of error values comprises the following substeps;
      for a given triangle T belonging to the first set of triangles, identifying a plurality of planar polygons corresponding to said triangle T and deriving error values for the said planar polygons based upon said first set of error values,
      identifying at least one planar polygon corresponding to a given triangle belonging to the second set of triangle and,
      generating a subset of sad second set of error values associated with vertices corresponding to said triangle O based upon error values for said at least one planar polygon corresponding to said triangle O.

2. The method of claim 1, further comprising the step of:
   upon determining that said second set of error values satisfies said predetermined criterion, associating said second set of error values with said vertices corresponding to said first set of triangles for subsequent processing.

3. The method of claim 1, wherein said predetermined criterion is based upon tolerance values corresponding to said second set of error values.

4. The method of claim 3, wherein said predetermined criterion is satisfied when maximum of said second set of error values is less than a minimum of said tolerance values.

5. The method of claim 1, wherein said second set of error values includes an error value corresponding to said simplified vertex and each vertex of said set of triangles except for said first vertex and said second vertex.

6. The method of claim 5, wherein said second set of error values are generated based upon a series of constraints.

7. The method of claim 6, wherein at least one of said series of constraints is based upon error values corresponding to triangles.

8. The method of claim 7, wherein error values corresponding to a given triangle are derived by interpolation of error values assigned to vertices of said given triangle.

9. The method of claim 8, further comprising the steps of:
   for each given triangle of said second set,
      decomposing said given triangle into convex parts each projecting onto one of said triangles of said first set;
      for each convex part of said given triangle,
      identifying a corner of said convex part,
      generating an error value associated with said corner,
   calculating a distance of said corner with respect to said projection onto said one triangle of said first set; and
   generating an error value for vertices of said given triangle based upon said error values and said distances for each of said convex parts of said given triangle.

10. The method of claim 9, wherein said projection is an orthogonal projection.

11. The method of claim 8, further comprising the steps of:
   constructing a first tiling of said first set of triangles,
   constructing a second tiling of said second set of triangles, wherein said second tiling has a one-to-one correspondence to said first tiling;
   computing distances between corresponding vertices in said first tiling and said second tiling;
   generating error values for vertices of said second set of triangles based upon said distances.

12. The method of claim 1, wherein said first set of triangles comprises an edge star corresponding to said edge.

13. A program storage device for use in a computer system wherein objects are represented by triangles defined by coordinates of vertices, the program storage device readable by a machine, tangibly embodying a program of instructions executable by the machine to perform method steps for generating coordinates of a simplified vertex based upon coordinates of said vertices, the method steps comprising:
   identifying a first vertex and a second vertex that define an edge of said triangles;
   identifying a first set of triangles that are adjacent to said edge, wherein a first set of error values are associated with vertices corresponding to said first set of triangles;

generating potential coordinates of said simplified vertex based upon coordinates of said first vertex and second vertex;

identifying a second set of triangle that share said simplified vertex and generating a second set of error values associated with vertices corresponding tQ said second set of triangles: and upon determining that said second set of error values satisfies a predetermined criterion, assigning coordinates of said simplified vertex to said potential coordinates and storing coordinates of said simplified vertex in memory for subsequent rendering by the computer system, wherein the step of generating said second set of error values comprises the following substeps:

for a given triangle T belonging to the first set of triangles, identifying a plurality of planar polygons corresponding to said triangle T and deriving error values for the sad planar polygons based upon said first set of error values, identifying at least one planar polygon corresponding to a given triangle O belonging to the second set of triangles, and generating a subset of said second set of error values associated with vertices corresponding to said triangle O based upon error values for said at least one planar polygon corresponding to said triangle O.

14. The program storage device of claim 13, said method steps further comprising:

upon determining that said second set of error values satisfies said predetermined criterion, associating said second set of error values with said vertices corresponding to said first set of triangles for subsequent processing.

15. The program storage device of claim 13, wherein said predetermined criterion is based upon tolerance values corresponding to said second set of error values.

16. The program storage device of claim 15, wherein said predetermined criterion is satisfied when maximum of said second set of error values is less than a minimum of said tolerance values.

17. The program storage device of claim 13, wherein said second set of error values includes an error value corresponding to said simplified vertex and each vertex of said set of triangles except for said first vertex and said second vertex.

18. The program storage device of claim 17, wherein said second set of error values are generated based upon a series of constraints.

19. The program storage device of claim 18, wherein at least one of said series of constraints is based upon error values corresponding to triangles.

20. The program storage device of claim 19, wherein error values corresponding to a given triangle are derived by interpolation of error values assigned to vertices of said given triangle.

21. The program storage device of claim 20, said method steps further comprising:

for each given triangle of said second set, decomposing said given triangle into convex parts each projecting onto one of said triangles of said first set;

for each convex part of said given triangle, identifying a corner of said convex part, generating an error value associated with said corner, calculating a distance of said corner with respect to said projection onto said one triangle of said first set; and generating an error value for vertices of said given triangle based upon said error values and said distances for each of said convex parts of said given triangle.

22. The program storage device of claim 21, wherein said projection is an orthogonal projection.

23. The program storage device of claim 20, said method steps further comprising:

constructing a first tiling of said first set of triangles, constructing a second tiling of said second set of triangles, wherein said second tiling has a one-to-one correspondence to said first tiling;

computing distances between corresponding vertices in said first tiling and said second tiling;

generating error values for vertices of said second set of triangles based upon said distances.

24. The program storage device of claim 13, wherein said first set of triangles comprises an edge star corresponding to said edge.

25. In a computer system wherein objects are represented by triangles defined by coordinates of vertices and by attribute data associated with vertices of said triangles, a method for generating attribute data associated with a simplified vertex comprising the steps of:

identifying a first vertex and second vertex that define an edge;

identifying a first set of triangles that are adjacent to said edge, wherein a first set of attribute error values are associated with vertices corresponding to said first set of triangles;

generating potential coordinates of said simplified vertex based upon coordinates of said first vertex and second vertex;

generating potential attribute data associated with said simplified vertex;

generating a second set of attribute error values based upon said first set of attribute error values and said potential attribute data associated with said simplified vertex; and upon determining that said second set of attribute error values satisfies a predetermined criterion, assigning said attribute data associated with said simplified vertex to said potential attribute data storing said attribute data associated with said simplified vertex in memory for subsequent rendering by the computer system.

26. The method of claim 25, further comprising the step of:

upon determining that said second set of attribute error values satisfies said predetermined criterion, associating said second set of attribute error values with vertices corresponding to said first set of triangles for subsequent processing.

27. The method of claim 25, wherein said predetermined criterion is based upon attribute tolerance values corresponding to said second set of attribute error values.

28. The method of claim 27, wherein said predetermined criterion is satisfied when maximum of said second set of attribute error values is less than a minimum of said attribute tolerance values.

29. The method of claim 25, wherein said second set of attribute error values includes an attribute error value corresponding to said simplified vertex and each vertex of said first set of triangles except for said first vertex and said second vertex.

30. The method of claim 29, wherein said second set of attribute error values are generated based upon a series of constraints.

31. The method of claim 30, wherein at least one of said series of constraints is based upon attribute error values corresponding to triangles.

32. The method of claim 30, wherein attribute error values corresponding to a given triangle are derived by interpolation of attribute error values assigned to vertices of said given triangle.

33. The method of claim 32, further comprising the steps of:
identifying a second set of triangles that share said simplified vertex;
for each given triangle of said second set,
decomposing said given triangle into convex parts each projecting onto one of said triangles of said first set;
for each convex part of said given triangle,
identifying a corner of said convex part,
generating an attribute error value associated with said corner,
calculating distance of attribute data associated with said corner with respect to attribute data associated with said projection onto said one triangle of said first set; and
generating attribute errors value for vertices of said given triangle based upon said attribute error values and distances for each of said convex parts of said given triangle.

34. The method of claim 33, wherein said projection is an orthogonal projection.

35. The method of claim 32, further comprising the steps of:
identifying a second set of triangles that share said simplified vertex;
constructing a first tiling of said first set of triangles,
constructing a second tiling of said second set of triangles, wherein said second tiling has a one-to-one correspondence to said first tiling;
computing distances between attribute data associated with corresponding vertices in said first tiling and said second tiling;
generating attribute error values for vertices of said second set of triangles based upon said distances.

36. The method of claim 25, wherein said first set of triangles comprises an edge star corresponding to said edge.

37. The method of claim 25, wherein said attribute data associated with a vertex comprises one of color associated with said vertex and texture coordinates associated with said vertex.

38. A program storage device for use in a computer system wherein objects are represented by triangles defined by coordinates of vertices and by attribute data associated with vertices of said triangles, the program storage device readable by a machine, tangibly embodying a program of instructions executable by the machine to perform method steps for generating attribute data associated with a simplified vertex said method steps comprising:
identifying a first vertex and second vertex that define an edge;
identifying a first set of triangles that are adjacent to said edge, wherein a first set of attribute error values are associated with vertices corresponding to said first set of triangles;
generating potential coordinates of said simplified vertex based upon coordinates of said first vertex and second vertex;
generating potential attribute data associated with said simplified vertex;
generating a second set of attribute error values based upon said first set of attribute error values and said potential attribute data associated with said simplified vertex; and
upon determining that said second set of attribute error values satisfies a predetermined criterion, assigning said attribute data associated with said simplified vertex to said potential attribute data storing said attribute data associated with said simplified vertex in memory for subsequent rendering by the computer system.

39. The program storage device of claim 38, said method steps further comprising:
upon determining that said second set of attribute error values satisfies said predetermined criterion, associating said second set of attribute error values with vertices corresponding to said first set of triangles for subsequent processing.

40. The program storage device of claim 38, wherein said predetermined criterion is based upon attribute tolerance values corresponding to said second set of attribute error values.

41. The program storage device of claim 40, wherein said predetermined criterion is satisfied when maximum of said second set of attribute error values is less than a minimum of said attribute tolerance values.

42. The program storage device of claim 38, wherein said second set of attribute error values includes an attribute error value corresponding to said simplified vertex and each vertex of said first set of triangles except for said first vertex and said second vertex.

43. The program storage device of claim 42, wherein said second set of attribute error values are generated based upon a series of constraints.

44. The program storage device of claim 43, wherein at least one of said series of constraints is based upon attribute error values corresponding to triangles.

45. The program storage device of claim 30, wherein attribute error values corresponding to a given triangle are derived by interpolation of attribute error values assigned Lo vertices of said given triangle.

46. The program storage device of claim 45, said method steps further comprising:
identifying a second set of triangles that share said simplified vertex;
for each given triangle of said second set,
decomposing said given triangle into convex parts each projecting onto one of said triangles of said first set;
for each convex part of said given triangle,
identifying a corner of said convex part,
generating an attribute error value associated with said corner,
calculating distance of attribute data associated with said corner with respect to attribute data associated with said projection onto said one triangle of said first set; and
generating attribute errors value for vertices of said given triangle based upon said attribute error values and distances for each of said convex parts of said given triangle.

47. The program storage device of claim 46, wherein said projection is an orthogonal projection.

48. The program storage device of claim 45, further comprising the steps of:
identifying a second set of triangles that share said simplified vertex;
constructing a first tiling of said first set of triangles, constructing a second tiling of said second set of triangles, wherein said second tiling has a one-to-one correspondence to said first tiling;

computing distances between attribute data associated with corresponding vertices in said first tiling and said second tiling;

generating attribute error values for vertices of said second set of triangles based upon said distances.

49. The program storage device of claim 38, wherein said first set of triangles comprises an edge star corresponding to said edge.

50. The program storage device of claim 38, wherein said attribute data associated with a vertex comprises one of color associated with said vertex and texture coordinates associated with said vertex.

* * * * *